United States Patent
Kato

(10) Patent No.: US 9,590,974 B2
(45) Date of Patent: Mar. 7, 2017

(54) COMMUNICATION APPARATUS, COMMUNICATION SYSTEM, AND RECORDING MEDIUM

(71) Applicant: Yoshinaga Kato, Kanagawa (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 164 days.

(21) Appl. No.: 14/306,653

(22) Filed: Jun. 17, 2014

(65) Prior Publication Data

US 2015/0007302 A1    Jan. 1, 2015

(30) Foreign Application Priority Data

Jun. 26, 2013    (JP) .................................. 2013-134146
Jan. 17, 2014    (JP) .................................. 2014-006624

(51) Int. Cl.
| | |
|---|---|
| *H04L 29/06* | (2006.01) |
| *H04W 12/08* | (2009.01) |
| *H04W 12/06* | (2009.01) |

(52) U.S. Cl.
CPC ...... *H04L 63/0823* (2013.01); *H04L 63/0838* (2013.01); *H04L 63/0853* (2013.01); *H04W 12/06* (2013.01); *H04W 12/08* (2013.01)

(58) Field of Classification Search
CPC ............. H04L 63/0823; H04L 63/0838; H04L 63/0853; H04W 48/16; H04W 12/04; H04W 12/06; H04W 12/08
See application file for complete search history.

(56) References Cited

U.S. PATENT DOCUMENTS

| 8,533,272 B2 | 9/2013 | Alicherry et al. |
| 8,537,395 B2 | 9/2013 | Shozaki |

(Continued)

FOREIGN PATENT DOCUMENTS

| JP | 2007-293538 | 11/2007 |
| JP | 2010-517474 | 5/2010 |

(Continued)

OTHER PUBLICATIONS

Extended European Search Report issued Oct. 28, 2014 in Patent Application No. 14172856.8.

(Continued)

*Primary Examiner* — Eleni Shiferaw
*Assistant Examiner* — Nelson Giddins
(74) *Attorney, Agent, or Firm* — Oblon, McClelland, Maier & Neustadt, L.L.P.

(57) ABSTRACT

A communication apparatus includes a communication unit that connects with an external device in a one-to-one relationship, the external device storing certificate information required for connection with a network; an acquisition unit that acquires the certificate information from the external device connected with the communication unit; and a connection request unit that sends a request for connection with the network to a communication management device, the request including the certificate information acquired by the acquisition unit, so that the communication management device determines whether to permit the connection with the network in response to the request received from the communication apparatus.

11 Claims, 19 Drawing Sheets

(56) References Cited

U.S. PATENT DOCUMENTS

| | | | |
|---|---|---|---|
| 2005/0239439 A1* | 10/2005 | Manabe | 455/410 |
| 2006/0075242 A1 | 4/2006 | Aissi et al. | |
| 2006/0236105 A1* | 10/2006 | Brok et al. | 713/169 |
| 2010/0165879 A1 | 7/2010 | Gupta et al. | |
| 2011/0261817 A1* | 10/2011 | Morris | 370/392 |
| 2012/0002003 A1 | 1/2012 | Okita et al. | |
| 2012/0106387 A1* | 5/2012 | Nakamura et al. | 370/252 |
| 2013/0081113 A1* | 3/2013 | Cherian et al. | 726/4 |
| 2013/0219455 A1* | 8/2013 | Bender et al. | 726/1 |
| 2014/0068711 A1* | 3/2014 | Schweitzer et al. | 726/3 |

FOREIGN PATENT DOCUMENTS

| | | |
|---|---|---|
| JP | 2010-218417 | 9/2010 |
| JP | 2011-135389 | 7/2011 |
| JP | 2011-188312 | 9/2011 |
| JP | 2012-075073 | 4/2012 |

OTHER PUBLICATIONS

"Wi-Fi Protected Setup Specification Version 1.0h", XP055831152, Dec. 31, 2006, 110 pages, Retrieved from the Internet: URL:http://gpl.back2roots.org/source/puma5/netgear/CG3200-1TDNDS_GPL/ap/apps/wpa2/original/Wi-Fi Protected-Setup Specification1.8h.pdf.

\* cited by examiner

COMMUNICATION APPARATUS, COMMUNICATION SYSTEM, AND RECORDING MEDIUM

BACKGROUND OF THE INVENTION

1. Field of the Invention

The present invention relates to a communication apparatus, a communication system, and a recording medium.

2. Description of the Related Art

In recent years, a remote conferencing system which performs teleconferencing between remote places via a communication network such as the Internet has become increasingly popular. If a communication apparatus for use in the remote conferencing system is configured to utilize wireless communication such as a wireless LAN to connect with the communication network, increased flexibility of an installation place of the communication apparatus may be provided over that in a case where only a cable LAN is utilized and increased convenience to users may be supplied.

However, unlike the cable communication, the wireless communication has a problem such that, if radio waves used in the wireless communication are illegally intercepted by a third party, the third party can gain access to data carried in the radio waves. In order to resolve the problem, technologies for securing wireless computer networks using any one of WEP (wired equivalent privacy), WPA (Wi-Fi protected access), WPA2, etc., the existing security standards of wireless computer networks, are put in practical use. For example, see Japanese Laid-Open Patent Publication No. 2011-188312.

Moreover, an information processing device which is arranged to process data to be transmitted and received between the information processing device and a terminal according to a mode of connection with the terminal has been proposed to prevent leakage of the data exchanged between the information processing device and the terminal without putting a burden on a user. For example, see Japanese Laid-Open Patent Publication No. 2010-218417.

However, it has been difficult in the related art to supply enhanced prevention of leakage of information from a communication apparatus and allow a user to set up security information in a simple manner.

SUMMARY OF THE INVENTION

In one aspect, the present invention provides a communication apparatus which supplies enhanced prevention of leakage of information from the communication apparatus and allows a user to set up security information in a simple manner.

In an embodiment which solves or reduces one or more of the above-mentioned problems, the present invention provides a communication apparatus including: a communication unit configured to connect with an external device in a one-to-one relationship, the external device storing certificate information required for connection with a network; an acquisition unit configured to acquire the certificate information from the external device connected with the communication unit; and a connection request unit configured to send a request for connection with the network to a communication management device, the request including the certificate information acquired by the acquisition unit, so that the communication management device determines whether to permit the connection with the network in response to the request received from the communication apparatus.

Other objects, features and advantages of the present invention will be more apparent from the following detailed description when read in conjunction with the accompanying drawings.

DETAILED DESCRIPTION OF THE PREFERRED EMBODIMENTS

A description will be given of embodiments with reference to the accompanying drawings.

[Overall Configuration of Embodiment]

Figure 1:
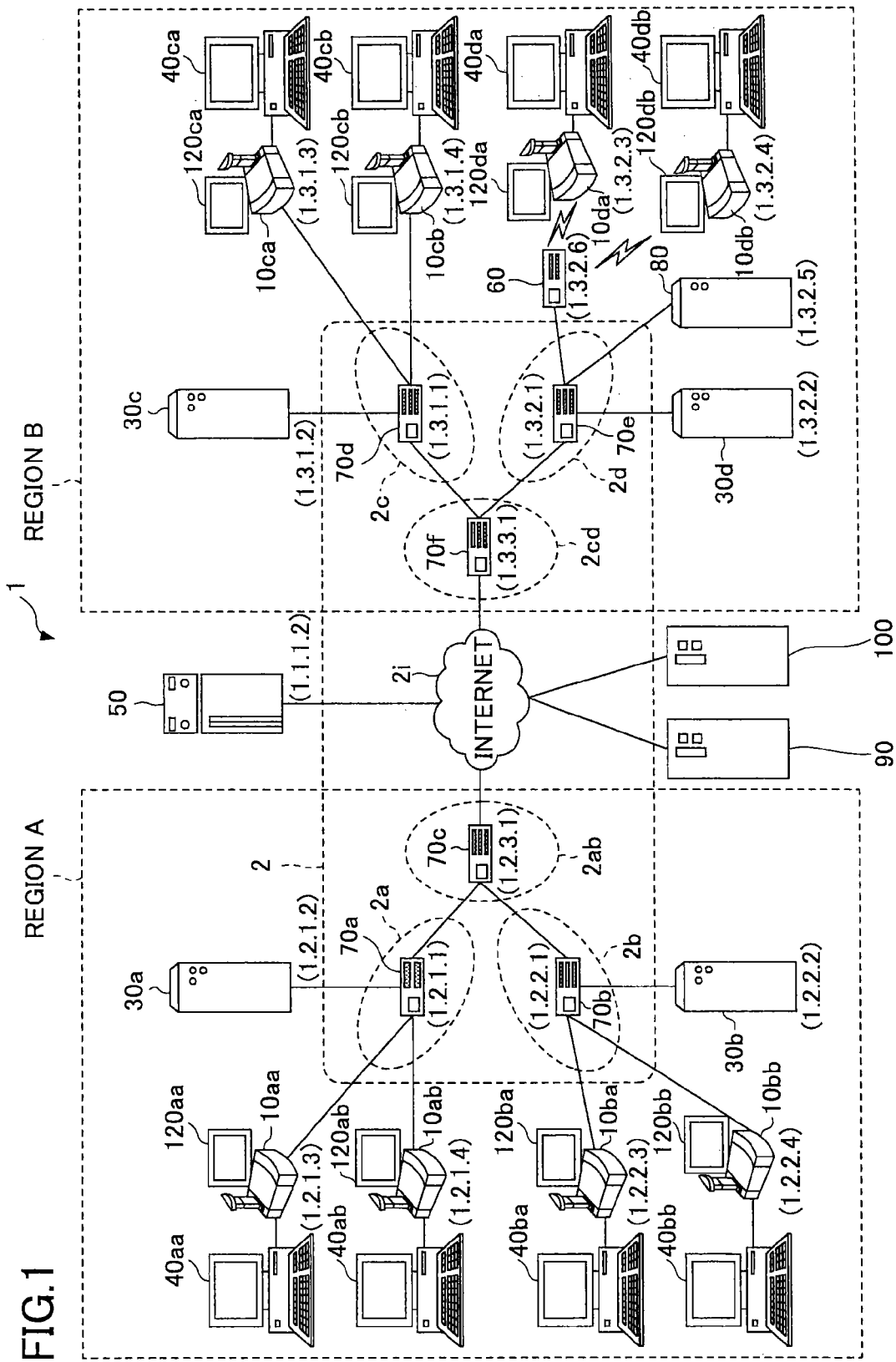
FIG. 1 is a schematic diagram showing a transmission system according to an embodiment.

FIG. 1 is a diagram showing an overall configuration of a transmission system 1 according to an embodiment.

There are various types of transmission systems. One example may be a data provision system which transmits content data from one terminal to another terminal via a transmission management system in one-way direction. Another example may be a communication system which mutually communicates information or emotional expressions among two or more communication apparatuses via the transmission management system. This communication system is used for mutually exchanging information or emotional expressions among the two or more communication terminals (i.e., the communication apparatuses) via a communication management system (i.e., the transmission management system). Examples of the communication system include a videoconference system, a visual telephone system, an audio conference system, a voice-call system, and a personal computer screen sharing system.

The following embodiments describe the transmission system, the transmission management system, and the communication apparatus by conceptualizing the videoconference system as an example of the communication system, the videoconference management system as an example of the communication management system, and the videoconference terminal as an example of the communication apparatus. Namely, the communication apparatus and the transmission management system utilized in the following embodiments may be applied not only to the videoconference system, but may also be applied to the communication system or the transmission system.

As shown in FIG. 1, the transmission system 1 includes two or more communication apparatuses (10aa, 10ab, ..., 10db), displays (120aa, 120ab, ..., 120db) for the communication apparatuses (10aa, 10ab, ..., 10db), two or more relay devices (30a, 30b, 30c, 30d), a transmission management system 50, a program supply system 90, and a maintenance system 100.

Note that in this embodiment, any one of the communication apparatuses (10aa, 10ab, ..., 10db) may be referred to as "communication apparatus 10", any one of the displays (120aa, 120ab, ..., 120db) may be referred to as "display 120", and any one of the relay devices (30a, 30b, 30c, 30d) may be referred to as "relay device 30".

The communication apparatus 10 is configured to transmit and receive image data, voice data, etc. to and from another communication apparatus 10. Note that in this embodiment, a case in where the image data is moving-picture image data is explained. However, the communication apparatus 10 may be configured to transmit and receive still-picture image data. Alternatively, the image data may include both moving-picture image data and still-picture image data.

Note that in this embodiment, among the communication apparatuses (10aa, 10ab, ..., 10db), the communication apparatuses 10da and 10db are configured to include a wireless LAN interface and connected to a communication network 2 through a wireless LAN access point 60. In addition, in this embodiment, a communication management device 80 is configured to operate as an IEEE802.11X authentication server.

The relay device 30 is configured to relay the image data and the voice data among the communication apparatuses 10. The transmission management system 50 is configured to manage the communication apparatus 10 and the relay device 30 in an integrated manner.

The external input device 40 is connected to the communication apparatus 10 and configured to transmit document data to the communication apparatus 10 for displaying the document data. For example, the document data is data which is used by document creation software, spreadsheet software, presentation software, etc.

Routers (70a, 70b, ..., 70f) shown in FIG. 1 are configured to select optimal paths for the image data and the voice data. Note that in this embodiment, any one of the routers (70a, 70b, ..., 70f) may be referred to as "router 70". The program supply system 90 includes a not-illustrated hard disk (HD) configured to store programs for a communication apparatus, with which the communication apparatus 10 may implement various functions or various units, and transmit the programs to the communication apparatus 10. The HD of the program supply system 90 is configured to further store programs for a relay device 30, with which the relay device 30 implements various functions or various units, and transmit the programs for the relay device to the relay device 30. In addition, the HD of the program supply system 90 is configured to store transmission management programs, with which the transmission management system 50 implements various functions or various units, and transmit the transmission management programs to the transmission management system 50.

As shown in FIG. 1, the communication apparatus 10aa, the communication apparatus 10ab, the relay device 30a, and the router 70a are connected via a LAN 2a so that they may communicate with each other. The communication apparatus 10ba, the communication apparatus 10bb, the relay device 30b, and the router 70b are connected via a LAN 2b so that they may communicate with each other. The LAN 2a and the LAN 2b are connected by a dedicated line 2ab including a router 70c so that they communicate with each other, and the LAN 2a and the LAN 2b are set up in a predetermined region A. For example, the region A may be Japan, the LAN 2a may be set up in an office in Tokyo, and the LAN 2b may be set up in an office in Osaka.

Meanwhile, the communication apparatus 10ca, the communication apparatus 10cb, the relay device 30c, and the router 70d are connected via a LAN 2c so that they may communicate with each other. The communication apparatus 10da, the communication apparatus 10db, the relay device 30d, and the router 70e are connected via a LAN 2d so that they may communicate with each other. The LAN 2c and the LAN 2d are connected by a dedicated line 2cd including a router 70f so that they communicate with each other, and the LAN 2c and the LAN 2d are set up in a predetermined region B. For example, the region B may be USA, the LAN 2c may be set up in an office in New York, and the LAN 2d may be set up in an office in Washington, D.C. The region A and the region B are connected from the respective routers 70c and 70f via the Internet 2i so that the region A and the region B are mutually in communication via the Internet 2i.

Further, the transmission management system 50 and the program supply system 90 are connected to the communication apparatus 10 and the relay device 30 via the Internet 2i so that they may communicate with each other. Alternatively, the transmission management system 50 and the program supply system 90 may be located in the region A or the region B, or may be located in a region other than the regions A and B.

Note that in this embodiment, the communication network 2 is made up of the LAN 2a, the LAN 2b, the dedicated line 2ab, the Internet 2i, the dedicated line 2cd, the LAN 2c, and the LAN 2d. In the communication network 2, the communication is typically carried out via the wires, but may be partially carried out wirelessly.

In FIG. 1, the set of four numbers attached under each of the communication apparatus 10, the relay device 30, the transmission management system 50, the router 70, and the program supply system 90 simply indicates an IP address of the typical IPv4 (Internet Protocol version 4). For example, the IP address of the communication apparatus 10aa is "1.2.1.3" as shown in FIG. 1. Alternatively, the IP addresses of the IPv6 may be used instead of the IP addresses of the IPv4. However, in this embodiment, the IPv4 is used for simplifying the illustration.

[Hardware Configuration of Embodiment]

Next, a hardware configuration of a communication apparatus 10 in the transmission system according to the embodiment is explained.

Figure 2:
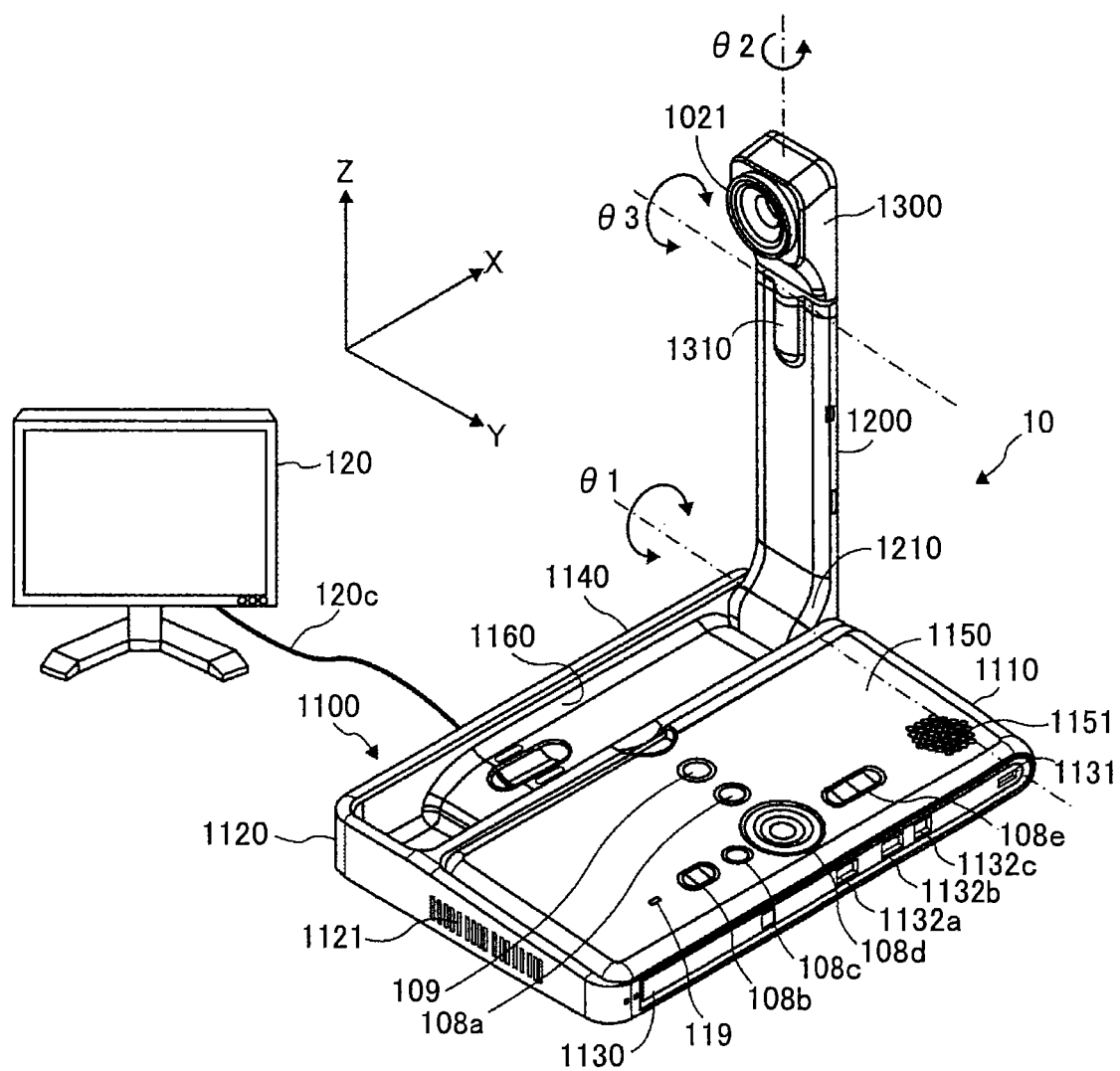
FIG. 2 is an external diagram showing a communication apparatus in the transmission system according to the embodiment.
Figure 3:
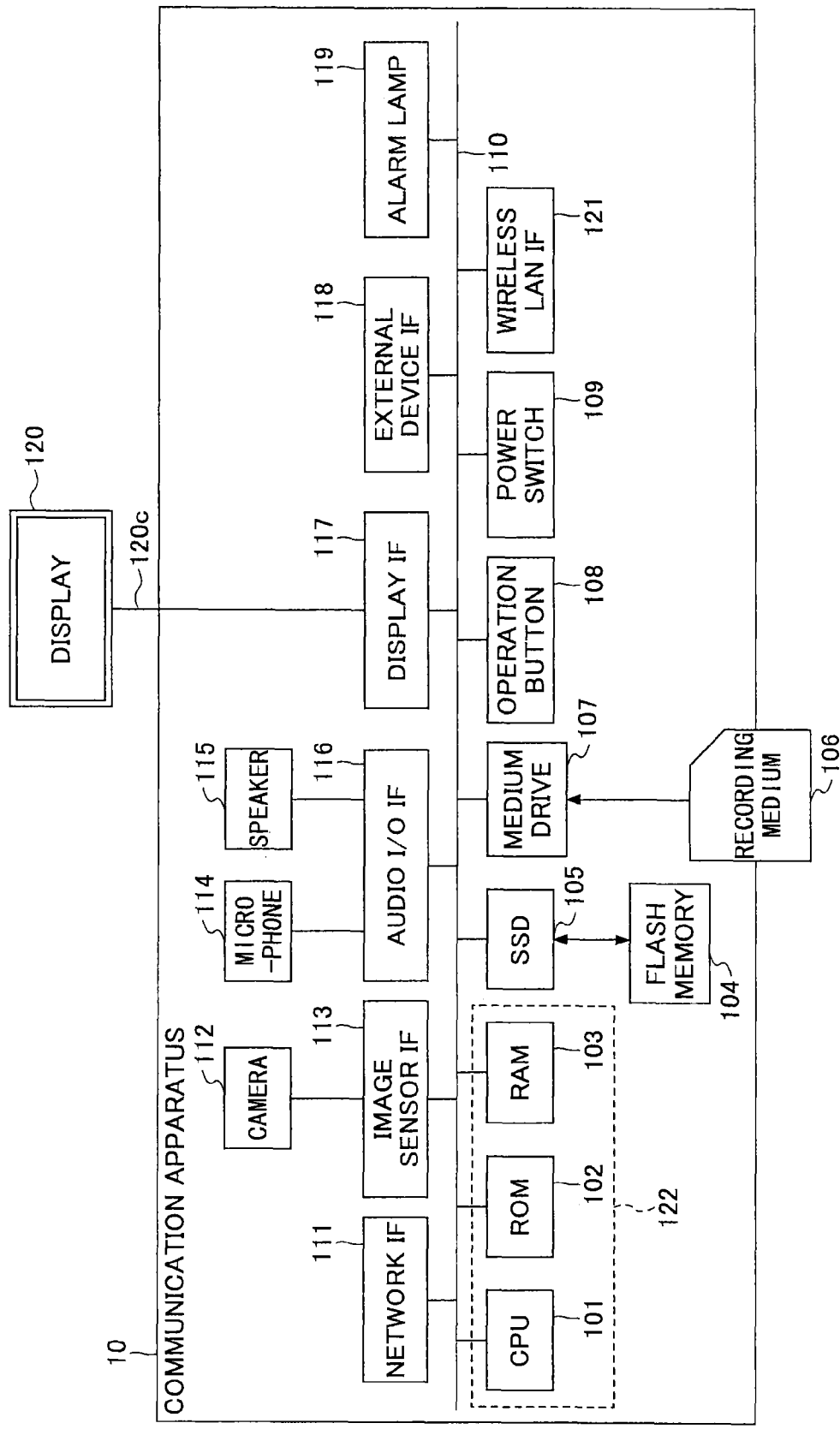
FIG. 3 is a diagram showing a hardware configuration of the communication apparatus in the transmission system according to the embodiment.

FIG. 2 is an external diagram showing the communication apparatus 10. FIG. 3 is a diagram showing a hardware configuration of the communication apparatus 10.

Hereinafter, an X-axis direction represents a longitudinal direction of the communication apparatus 10, a Y-axis direction represents a direction perpendicular to the X-axis direction in a horizontal plane, and a Z-axis direction represents a direction perpendicular to the X-axis direction and the Y-axis direction (i.e., vertical direction).

As shown in FIG. 2, the communication apparatus 10 includes a housing 1100, an arm 1200, and a camera housing 1300. A front wall face 1110 of the housing 1100 includes a not-illustrated air intake surface which is formed of air intake holes, and a rear wall face 1120 of the housing 110 includes an exhaust surface 1121 which is formed of exhaust holes. Accordingly, the communication apparatus 10 may take in external air behind the communication apparatus 10 via the not-illustrated air intake surface and exhaust the air inside the communication apparatus 10 via the exhaust surface 1121 by driving a cooling fan arranged inside the housing 1100. A right wall face 1130 of the housing 1100 includes a sound-collecting hole 1131, via which a built-in microphone 114 (see FIG. 3) is able to collect sound, such as voice, other sound, or noise.

The right wall face 1130 of the housing 1100 includes an operation panel 1150. The operation panel 1150 includes operation buttons (108a-108e), a later-described power switch 109, a later-described alarm lamp 119, and a sound output face 1151 formed of sound output holes for outputting sound from a later-described built-in speaker 115. Further, a left wall face 1140 of the housing 1100 includes a recessed seat unit 1160 for accommodating the arm 1200 and the camera housing 1300. The right wall face 1130 of the housing 1100 further includes connection ports (1132a-1132c) for electrically connecting cables to the later-described external device connection IF (interface) 118. On the other hand, the left wall face 1140 of the housing 1100 further includes a not illustrated connection port for electrically connecting a display connecting cable 120c for the display 120 to the later-described external device connection IF (interface) 118.

Note that in the following, any one of the operation buttons (108a-108e) may be called an "operation button 108" and any one of the connection ports (1132a-1132c) may be called a "connection port 1132".

Next, the arm 1200 is attached to the housing 1100 via a torque hinge 1210 such that the arm 120 is movable in upward and downward directions within a tilt-angle θ1 range of 135 degrees with respect to the housing 1100. The arm 1200 shown in FIG. 2 is arranged at a tilt angle θ1 of 90 degrees.

A built-in camera 1021 is arranged in the camera housing 1300 and the camera 1021 is configured to take images of a user, documents, a room, etc. The camera housing 1300 further includes a torque hinge 1310. The camera housing 1300 is attached to the arm 1200 via the torque hinge 1310. The camera housing 1300 is rotatably attached to the arm 1200 in the up/down and right/left directions via the torque hinge 1310 such that the camera housing 1300 is movable in a pan-angle θ2 range of ±180 degrees and a tilt-angle θ3 range of ±45 degrees based on the assumption that the pan and tilt angles shown in FIG. 2 are both 0.

As shown in FIG. 3, the communication apparatus 10 includes a central processing unit (CPU) 101, a read-only memory (ROM) 102, a random access memory (RAM) 103, a flash memory 104, a solid state drive (SSD) 105, a medium drive 107, an operation button 108, the power switch 109, a network interface (IF) 111, a camera 112, an image sensor interface (IF) 113, a microphone 114, a speaker 115, an audio input/output interface (I/O IF) 116, a display interface (IF) 117, the external device interface (IF) 118, the alarm lamp 119, a wireless LAN interface (IF) 121, and a bus line 110, such as an address bus or a data bus, for electrically connecting the above-mentioned components as shown in FIG. 3.

The CPU 101 is configured to control overall operations of the communication apparatus 10 by reading a program and data from the ROM 102 and performing processes. The ROM 102 is a nonvolatile memory which stores a program for the communication apparatus 10. The ROM 102 may be implemented by a flash ROM, etc. The RAM 103 is a volatile memory used as a work area of the CPU 101. The CPU 101, the ROM 102, and the RAM 103 constitute a control unit 122 which executes the program for the communication apparatus 10. The flash memory 104 is a nonvolatile memory which stores various data such as image data or audio data. The SSD 105 is configured to control retrieval and writing (storing) of the various data in the flash memory 104 based on the control of the CPU 101.

The medium drive 107 is configured to control retrieval and writing (storing) of data from and to a recording medium 106, such as a memory card. The operation button 108 is an input unit which is operated by a user for causing various operations of the communication apparatus 10. For example, the operation button 108 may be a touch panel or an input unit other than the operation button. The power switch 109 is a switch for switching ON/OFF the power of the communication apparatus 10. The network interface ill is an interface to the communication network 2 such as a cable LAN interface which transmits and receives data utilizing the communication network 2.

The camera 112 is configured to image a subject based on the control of the CPU 101 and includes lenses and a solid state image sensor configured to convert light into electric charges to produce digital images (videos) of the subject. Examples of the solid state image sensor include a complementary metal oxide semiconductor (CMOS) or a charge coupled device (CCD). The image sensor interface 113 is an interface configured to control driving of the camera 112 and acquire an image signal output from the camera 112 as a predetermined image data. The microphone 114 is configured to pick up sound, such as voice, other sound or noise, as an audio signal. The speaker 115 is configured to output sound from an input audio signal. The audio input/output interface 116 is configured to provide an interface for the inputting/outputting of the sound from the microphone 114 and to the speaker 115 based on the control of the CPU 101.

The display interface 117 is an interface configured to transmit image data to the display 120 based on the control of the CPU 101. The display 120 is a display unit formed of liquid crystal or an organic EL material and configured to display images of the subject or icons for operating the communication apparatus 10. Moreover, the display 120 is connected to the display interface 117 via the cable 120c. The cable 120c may be an analog RGB (VGA) cable, a component video cable, a high-definition multimedia interface (HDMI) cable or a digital video interactive (DVI) cable.

In the communication apparatus 10, the display 120 may be a built-in type such that the communication apparatus 10 and the display 120 are integrated in the housing. Alternatively, the communication apparatus 10 may be integrated with a projector instead of the display 120.

The external device interface 118 is an interface configured to transmit and receive various data to and from an external device. For example, the external device interface 118 may be connected via a universal serial bus (USB) to external devices, such as an external camera, an external microphone, and an external speaker, with a USB cable inserted into the connection port 1132 of the case 1100 shown in FIG. 2. When connecting the external camera to the external device interface 118 via the USB, the external camera is driven in priority to the built-in camera 112 based on the control of the CPU 101. Similarly, when the external microphone or the external speaker is connected, the external microphone or the external speaker is driven in priority to the built-in microphone 114 or the built-in speaker 115 based on the control of the CPU 101.

Further, the external device interface 118 of the communication apparatus 10 is configured to recognize only predetermined external devices, such as the external camera, the external microphone, and the external speaker, by taking into consideration security of information. Reading and writing of data is not carried out even if an external USB memory or hard disk drive is connected to such a system. Conventionally, it is difficult to import certificate information required for connection with the communication network to the communication apparatus 10.

The alarm lamp 119 is configured to inform the user of various functional problems or operating states of the communication apparatus 10. The wireless LAN interface 121 is an interface of a wireless LAN for transmitting and receiving data by utilizing the wireless LAN. The bus line 110 is a data bus or an address bus for electrically connecting the above-described elements and devices with one another as shown in FIG. 3.

The recording medium 106 is adapted to be detachably attached to the communication apparatus 10. The flash memory 104 is a nonvolatile memory which performs reading and writing of data based on the control of the CPU 101. Alternatively, the flash memory 104 may be replaced with an electrically erasable programmable ROM (EEPROM).

Note that the above-described program for the communication apparatus 10 may be recorded in an installable format or in an executable format on a computer-readable recording medium such as the recording medium 106 to distribute such a recording medium.

[Hardware Configuration of External Input Device]

Figure 4:
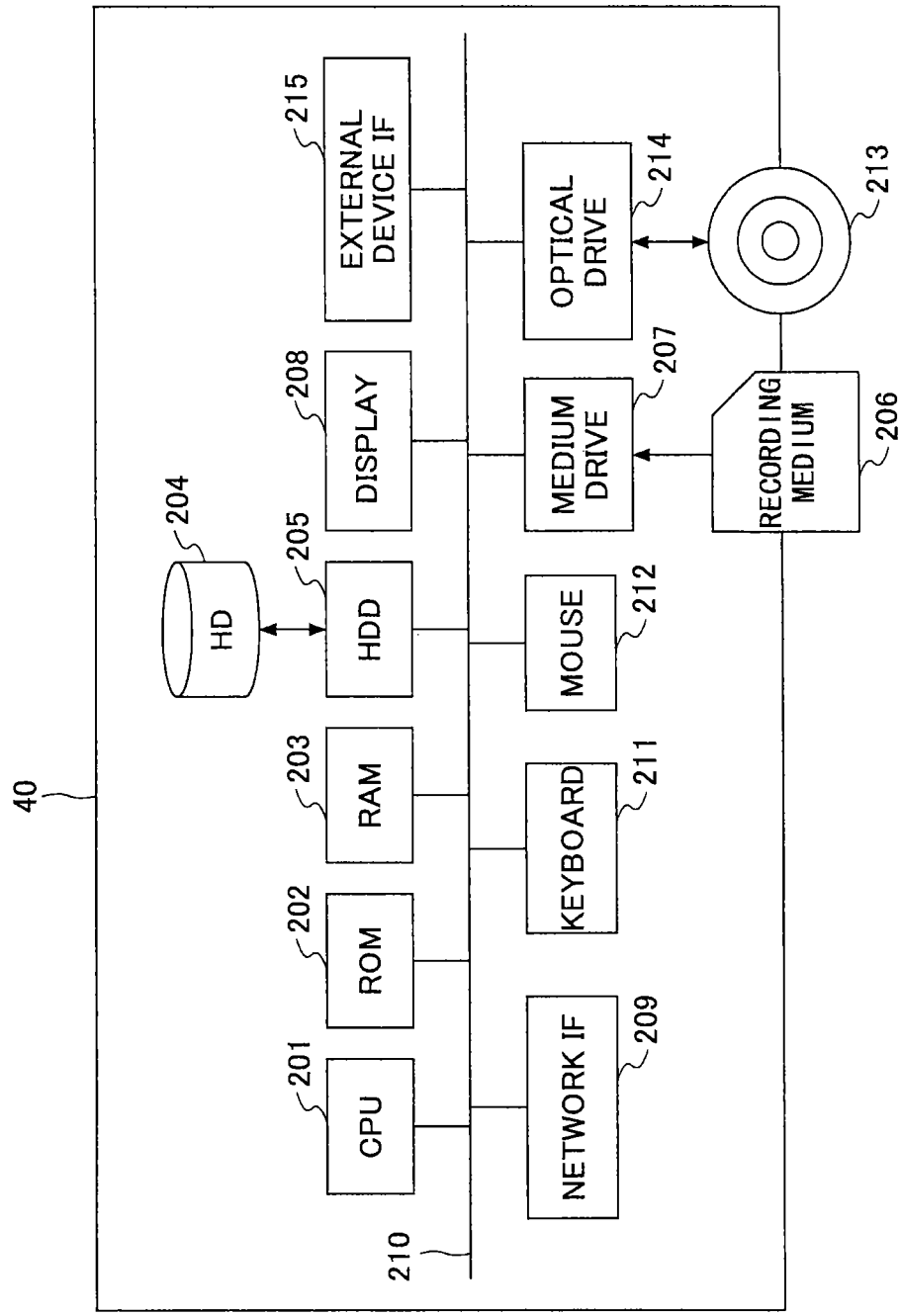
FIG. 4 is a diagram showing a hardware configuration of an external input device in the transmission system according to the embodiment.

FIG. 4 shows a hardware configuration of the external input device 40 according to the embodiment. For example, the external input device 40 has a configuration of a general-purpose computer. As shown in FIG. 4, the external input device 40 includes a CPU 201, a ROM 202, a RAM 203, a hard disk (HD) 204, a hard disk drive (HDD) 205, a medium drive 207, a display 208, a network interface 209, a keyboard 211, a mouse 212, an optical drive 214, an external device interface 215, and a bus line 210.

The CPU 201 is configured to control overall operations of the external input device 40 by reading a program and data from the ROM 202 or the HD 204 and performing processes. The ROM 202 is a nonvolatile memory which stores a program for the external input device 40. The ROM 202 may be implemented by a flash ROM, etc. The RAM 203 is a volatile memory used as a work area of the CPU 201.

The HD 204 stores various programs, data, image data, audio data, etc., which are needed for performing processes by the CPU 201. The HDD 205 is configured to control reading and writing of various data from and to the HD 204 based on the control of the CPU 201. The medium drive 207 is configured to control reading and writing of data from and to the recording medium 206, such as a memory card. The display 208 is configured to display various information items, such as a cursor, menus, windows, characters and images. In addition, the display 208 may be provided as an external input device in the external input device 40.

The network interface 209 is an interface for transmitting and receiving data through the communication network. The network interface 209 may include a cable LAN interface and/or a wireless LAN interface. The keyboard 211 includes plural keys for inputting the characters, numerals, and various instructions. The mouse 212 is a unit for selecting or executing various instructions, selecting items to be processed, and moving the cursor. The mouse 212 may be implemented by another pointing device, such as a touch panel or a touchpad. The optical drive 214 is configured to control reading or writing of data in an optical disk 213, such as a compact disk (CD), a digital versatile disk (DVD), or a Blu-ray disc (BD).

The external device interface 215 is an interface configured to transmit and receive various data to and from an external device. The external device interface 215 may include a USB interface. The bus line 210 is an address bus or a data bus for electrically connecting the above-described elements and devices with one another as shown in FIG. 4.

Note that the program for the external input device 40 may be recorded in the ROM 202. This program for the external input device 40 may be recorded in an installable format or in an executable format on a computer-readable recording medium such as the recording medium 206 to distribute such a recording medium.

First Embodiment

A first embodiment relates to setting up security information of a communication apparatus which is connected to a network by a wireless LAN. In the following, the Wi-Fi Protected Access (WPA or WPA2) enterprise mode as an example of authentication technology used in setting of wireless communication is explained. In addition to the WPA enterprise mode, the WPA personal mode (also referred to as WPA-PSK (pre-shared key) mode) is also available. While the WPA/WPA2 enterprise mode is designed for enterprise networks, the WPA/WPA2 personal mode is designed for home and small office networks.

In the WPA/WPA2 enterprise mode, the user (or the communication apparatus) is authenticated using an authentication server compliant with IEEE802.1X. According to the IEEE802.1X specifications, the communication apparatus is authenticated using the authentication protocol which is called EAP (extensible authentication protocol). When the authentication process has finished successfully, connection of the communication apparatus with the network is permitted. On the other hand, when the authentication process has failed, connection of the communication apparatus with the network is not permitted.

Although there are various EAP types, the authentication of the user (or the communication apparatus) according to the present embodiment is performed using a digital certificate.

[Configuration of Communication System]

Figure 5:
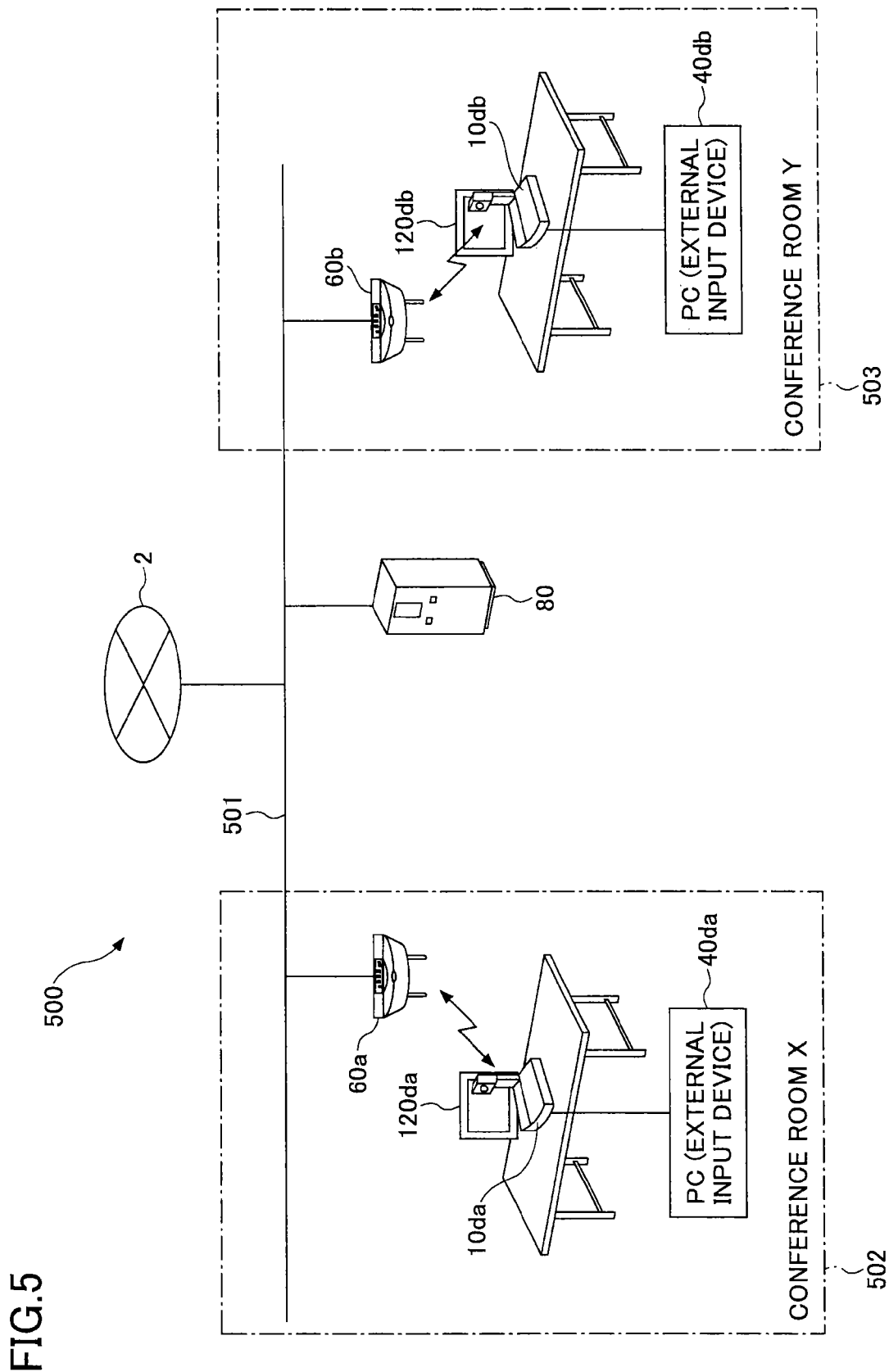
FIG. 5 is a schematic diagram of a communication system according to a first embodiment.

FIG. 5 is a schematic diagram of a communication system 500 according to the first embodiment. As shown in FIG. 5, the communication system 500 includes communication apparatuses 10da and 10db, external input devices 40da and 40db, access points 60a and 60b of a local area network (LAN) 501, and a communication management device 80. Moreover, a display 120da is connected to the communication apparatus 10da, and a display 120db is connected to the communication apparatus 10db.

For example, the access points 60a and 60b are installed in conference rooms 502 and 503 of a predetermined building, respectively. The access points 60a and 60b perform wireless communication with the communication apparatuses 10da and 10db, respectively. For example, the communication method of this wireless communication is a wireless LAN method conforming to the standard of IEEE802.11. Although there are various communication methods in the standards of IEEE802.11b/a/g/n, the communication method according to the present embodiment may conform to any one of these communication methods. In addition, the access points 60a and 60b are conforming to the specifications of the WPA/WPA2 enterprise mode or IEEE802.1X.

As an example, the communication apparatuses 10da and 10db may be teleconferencing terminals which are configured to connect with the LAN 501 and the communication network 2 via the access points 60a and 60b to perform communication with other communication apparatuses. The communication apparatuses 10da and 10db are designed to communicate with the access points 60a and 60b, respectively, in accordance with at least one of the requirements of the wireless LAN standard which the access points 60a and 60b are constructed to comply with. Further, the communication apparatuses 10da and 10db are configured to comply with the requirements of the standard of the WPA/WPA2 enterprise mode or IEEE802.1X.

As an example, the external input device 40da and 40db may be notebook PCs which are configured to communicate with the communication apparatuses 10da and 10db in accordance with a predetermined communication method, respectively. Alternatively, the external input device 40da and 40db may be information processing devices other than notebook PCs, such as desktop PCs, smart phones, tablet terminals, etc. The predetermined communication method used between the external input devices 40da, 40db and the communication apparatuses 10da, 10db may be a peer-to-peer connection by a cross LAN cable or an interconnection in the ad hoc mode of wireless LAN.

It is assumed that the interconnection between the external input device 40 and the communication apparatus 10 is a one-to-one connection by which the communication apparatus 10 and the external input device 40 are connected with each other by the wireless LAN without using a server. Examples of the interconnection may include the peer-to-peer connection by a cross LAN cable, the interconnection in the ad hoc mode of wireless LAN, and a one-to-one connection by a short-distance radio communication system such as Bluetooth®.

The external input devices 40da and 40db are configured to store certificate information required for connection with the network such as the LAN 501 or the communication network 2. Note that the external input devices 40da and 40db are examples of the external device according to the invention.

The communication management device 80 may be a server device which is connected to the network such as the LAN 501 or the communication network 2, and configured to perform an authentication process to determine whether connection with the network is permitted in response to a connection request to the network from the communication apparatus 10da or 10db.

[Functional Configuration]

Figure 6:
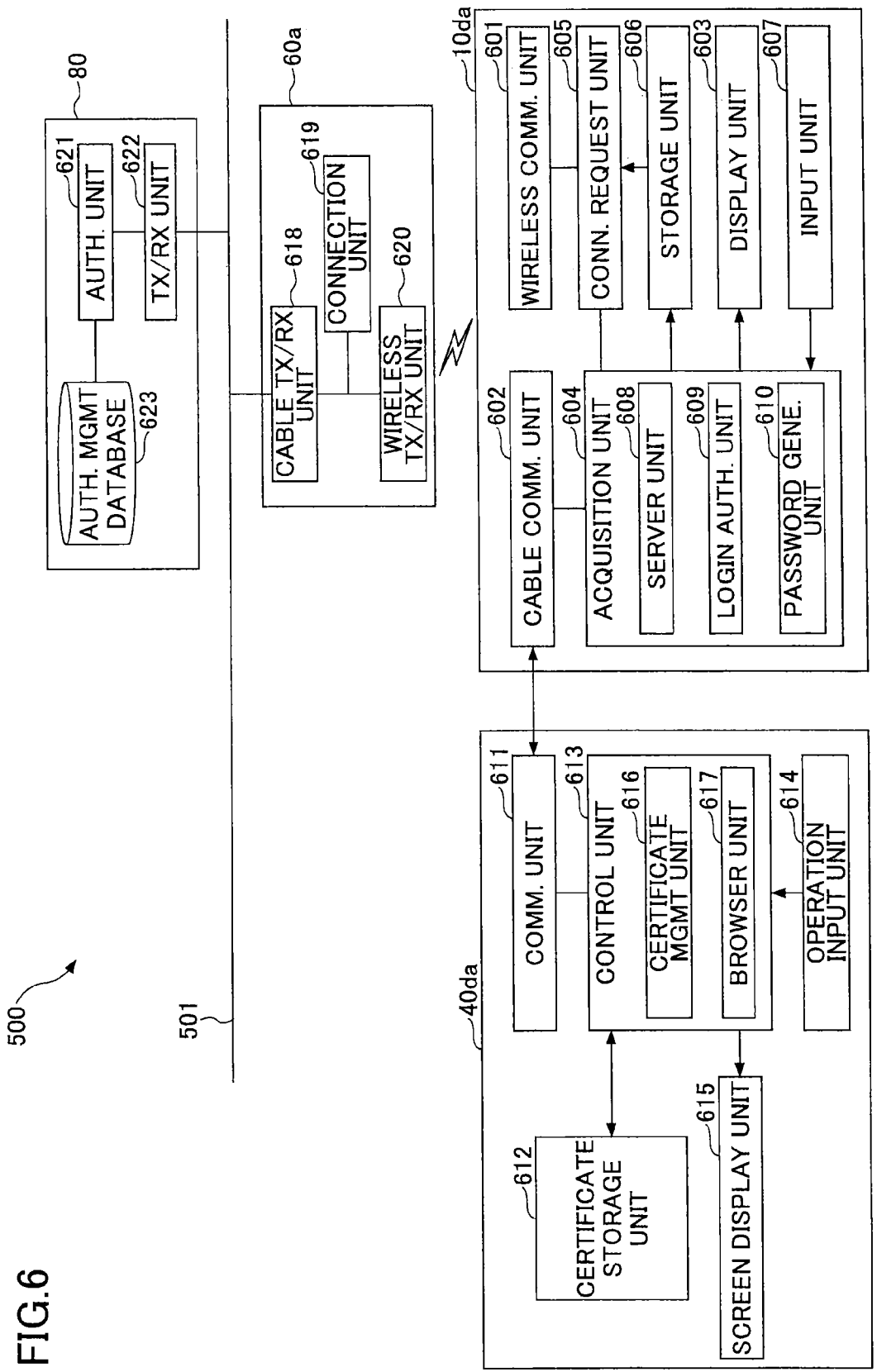
FIG. 6 is a diagram showing a functional configuration of the communication system according to the first embodiment.

Next, a functional configuration of the communication system 500 is explained with reference to FIG. 6. FIG. 6 shows a functional configuration of the communication apparatus 10da, the external input device 40da, the access point 60a, and the communication management device 80. The communication apparatus 10db shown in FIG. 5 has a functional configuration that is the same as that of the communication apparatus 10da, the access point 60b shown in FIG. 5 has a functional configuration that is the same as that of the access point 60a, and therefore a description thereof will be omitted.

As shown in FIG. 6, the communication apparatus 10da includes a wireless communication unit 601, a cable communication unit 602, a display unit 603, an acquisition unit 604, a connection request unit 605, a storage unit 606, and an input unit 607.

The wireless communication unit 601 is configured to transmit and receive data using the wireless LAN conforming to the standard of IEEE802.11. The wireless communication unit 601 may be implemented by the wireless LAN interface 121 shown in FIG. 3 and the software for controlling the wireless LAN interface 121.

The cable communication unit 602 is configured to transmit and receive data to and from the external input device 40da using a peer-to-peer connection by a cross LAN cable or a router, without using the LAN 501 or a server, through the one-to-one interconnection between the communication apparatus 10da and the external input device 40da. Moreover, the cable communication unit 602 may be configured to transmit and receive data to and from the external input device 40da by a secure communication protocol such as HTTPS (hypertext transfer protocol secure). The cable communication unit 602 may be implemented by the network interface 111 shown in FIG. 3 and the software for controlling the network interface 111. Further, the cable communication unit 602 may serve as an ordinary LAN interface by connecting the cable communication unit 602 to the network such as the LAN 501 by a straight LAN cable.

The display unit 603 is configured to display login information which is certification information required when a user on the external input device 40da connected to the cable communication unit 602 logs in the communication apparatus 10da. The display unit 603 may be implemented by the display 120 and the display interface 117 shown in FIG. 3 and the software for controlling the display 120 and the display interface 117.

The acquisition unit 604 is configured to acquire, from the external input device 40da connected to the cable communication unit 602, the certificate information required for connection with the network by the wireless communication unit 601. The acquisition unit 604 may be implemented by a program which is executed by the control unit 122 shown in FIG. 3. The acquisition unit 604 includes a server unit 608, a login authentication unit 609, and a password generation unit 610.

The password generation unit 610 is configured to generate a password to be included in the login information which is displayed by the display unit 603. Specifically, the password generation unit 610 according to this embodiment generates a one-time password which is a password that is valid for only one login session or transaction, each time the login information is displayed by the display unit 603.

The server unit 608 is configured to supply, to the external input device 40da, a web page to which the login information including the one-time password which is displayed by the display unit 603 is input through the cable communication unit 602.

The login authentication unit 609 is configured to determine whether the login of the external input device 40da is permitted based on the login information which is the certification information displayed on the display 120 by the display unit 603. For example, when the login information input to the web page supplied by the server unit 608 includes the one-time password displayed by the display unit 603, the login authentication unit 609 permits the login of the external input device 40da.

The connection request unit 605 is configured to send to the communication management device 80 a connection request for connection with the network by the wireless communication unit 601, using the certificate information acquired by the acquisition unit 604, when the correct one-time password is input from the external input device 40da and the login is permitted.

The storage unit 606 is configured to store the certificate information acquired by the acquisition unit 604, and an encryption key (which is received from the communication management device 80 when an authentication process has finished successfully by the communication management device 80) into the RAM 103 or the flash memory 104 shown in FIG. 3.

The input unit 607 is configured to receive input information indicated by key-in operation or selecting operation performed by the user of the communication apparatus 10da. The input unit 607 may be implemented by including the operation button 118 shown in FIG. 3.

By the above-described configuration, the communication apparatus 10da causes the display unit 603 to display the login information including the one-time password on the display 120. Then, the server unit 608 supplies the web page to which the login information is to be input to the display 208 of the external input device 40da connected to the cable communication unit 602. When the login information is input to the web page, the login authentication unit 609 determines whether the input login information includes the one-time password displayed by the display unit 603. When it is determined that the correct one-time password is included in the input login information, the login of the external input device 40da is permitted.

Subsequently, the acquisition unit 604 acquires the certificate information to be used for network authentication from the external input device 40da. When the login of the external input device 40da is permitted, the connection request unit 605 sends a connection request for connection with the network by the wireless communication unit 601 to the communication management device 80 using the certificate information acquired by the acquisition unit 604. When the connection with the network is permitted by the communication management device 80, the communication apparatus 10da is able to perform wireless connection with the network using the wireless communication unit 601.

Accordingly, the communication apparatus 10da is able to safely and easily acquire the certificate information required for network authentication from the external input device 40da. Hence, the communication apparatus 10da is able to perform communication setting.

Next, a functional configuration of the external input device 40da is explained. As shown in FIG. 6, the external input device 40da includes a communication unit 611, a certificate storage unit 612, a control unit 613, an operation input unit 614, and a screen display unit 615.

The communication unit 611 is configured to transmit and receive data using the cable LAN interface. For example, the communication unit 611 may be configured to transmit and receive data to and from the communication apparatus 10da by a secure communication protocol such as HTTPS (hypertext transfer protocol secure). By the peer-to-peer connection by a cross LAN cable or a hub, the interconnection between the external input device 40da and the communication apparatus 10da is allowed without using the LAN 501. As an example, the communication unit 611 may be an ordinary cable LAN interface provided in a PC.

The certificate storage unit 612 is configured to store in the HD 204 or the RAM 203 shown in FIG. 4 certificate information, such as a digital certificate, used between the external input device 40da and the communication management device 80 when an authentication process according to the certification program EAP-TLS (extensible authentication protocol-transport layer security) is performed. For example, the digital certificate is specified in the ITU-T standard X.509. The digital certificate includes a signature algorithm, an issuer name, a valid period, a user name, a user's public key, etc.

The control unit 613 is configured to execute various programs of the external input device 40da. The control unit 613 may be implemented by the CPU 201, the ROM 202 and the RAM 203 shown in FIG. 4. The control unit 613 includes a certificate management unit 616 and a browser unit 617.

The certificate management unit 616 is configured to manage the certificate information stored in the certificate storage unit 612. As an example, the certificate management unit 616 stores certificate information received from a certification authority into the certificate storage unit 612. Further, the certificate management unit 616 transmits the certificate information read from the certificate storage unit 612 to the communication apparatus 10da connected via the communication unit 611.

The browser unit 617 is configured to cause the screen display unit 615 to display the web page supplied by the communication apparatus 10da connected via the communication unit 611 on the display 208, and configured to transmit to the communication apparatus 10da the login information including the one-time password input to the web page by the operation input unit 614.

Next, the communication management device 80 and the access point 60a are explained. The communication management device 80 and the access point 60a are known in the related art, and only an outline of the communication management device 80 and the access point 60a is described.

As an example, the communication management device 80 is a server device having a hardware configuration of a general-purpose computer. As shown in FIG. 6, the communication management device 80 includes a transmission/reception (TX/RX) unit 622, an authentication management database 623, and an authentication unit 621.

The transmission/reception unit 622 is configured to connect the communication management device 80 to the network and transmit and receive data to and from the communication management device 80. The authentication management database 623 is configured to store digital certificates issued by the certification authority. The authentication unit 621 is configured to authenticate the user (or the communication apparatus) who has requested connection based on the authentication management database 623. As an example, the communication management device 80 is an authentication server configured to authenticate the communication apparatus 10da or 10db which has sent a connection request for connection with the network to the communication management device 80. The authentication server is known as a remote authentication dial-in user service (RADIUS) authentication server conforming to the standard of IEEE802.1X.

As shown in FIG. 6, the access point 60a includes a cable transmission/reception (TX/RX) unit 618, a connection unit 619, and a wireless transmission/reception (TX/RX) unit 620. The cable transmission/reception unit 618 is connected to the network such as the LAN 501 and configured to transmit and receive data to and from an apparatus connected to the network, such as the communication management device 80. The wireless transmission/reception unit 620 is configured to transmit and receive data to and from a wireless LAN terminal such as the communication apparatus 10da. The connection unit 619 is configured to control connection between the cable transmission/reception unit 618 and the wireless transmission/reception unit 620.

When connection with the access point 60a is requested, the communication apparatus 10da transmits a connection request including the certificate information to the communication management device 80. The connection request from the communication apparatus 10da is transferred to the communication management device 80 by the access point 60a. At this time, conversion of the packets is performed by the access point 60a, but the authentication process is performed between the communication apparatus 10da and the communication management device 80.

The communication management device 80 authenticates the certificate information included in the connection request received from the communication apparatus 10da based on the authentication management database 623. When the authentication process has finished successfully by the communication management device 80, the communication management device 80 informs the access point 60a that the authentication process has finished successfully. The connection unit 619 of the access point 60a having received the authentication result permits the connection of the communication apparatus 10da to the network.

On the other hand, when the authentication process has finished in failure, the connection unit 619 does not permit the connection of the communication apparatus 10da to the network. Namely, the connection unit 619 rejects the connection request, intercepts the communication from the non-authenticated communication apparatus, and permits the communication from the authenticated communication apparatus.

Figure 7:
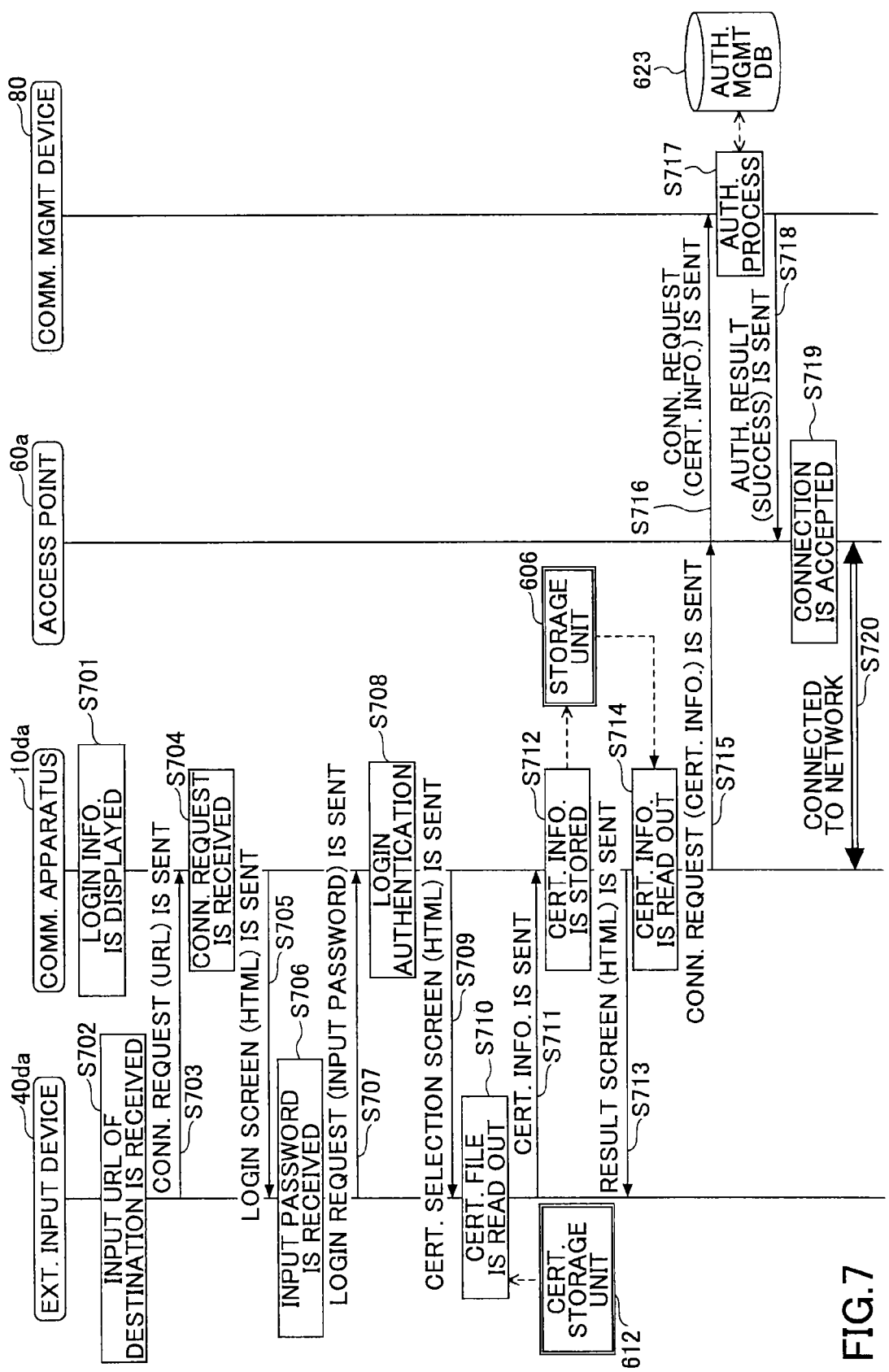
FIG. 7 is a sequence diagram for explaining a process performed by the communication system according to the first embodiment.

Next, operation of the communication system 500 according to the first embodiment is explained. FIG. 7 is a sequence diagram for explaining a process performed by the communication system 500.

When an instruction for starting a wireless communication setup process input by the user is received by the input unit 607, the communication apparatus 10da starts performing the wireless communication setup process. Alternatively, the process of FIG. 7 may be started by the communication apparatus 10da when the external input device 40da is connected to the cable communication unit 602 by a cross LAN cable.

Figure 8:
FIG. 8 is a diagram showing an example of login information displayed in the communication system according to the first embodiment.

The acquisition unit 604 of the communication apparatus 10da causes the password generation unit 610 to generate a one-time password, and the display unit 603 displays login information including the generated one-time password and a URL (uniform resource locator) of a connection destination on the display 120 (step S701). FIG. 8 shows an example of the login information displayed at this time. As shown in FIG. 8, the communication apparatus 10da displays a URL 801 of a connection destination and a one-time password 802 on the display 120 of FIG. 3. The URL 801 of the connection destination indicates an address of a web page for a login which is supplied by the server unit 608 of the communication apparatus 10da.

Referring back to FIG. 7, the browser unit 617 of the external input device 40da receives an input of the URL of the connection destination from the operation input unit 614 (step S702). The input of the URL is performed by the user. It is assumed that the input URL is the same as the URL 801 of the connection destination displayed on the display 120 at step S701. Upon receipt of the input URL, the browser unit 617 transmits a connection request including the input URL to the communication apparatus 10da through the communication unit 611 by HTTPS (hypertext transfer protocol secure) (step S703).

HTTP is insecure and is subject to eavesdropping attacks, which can let attackers gain access to sensitive information from the communication apparatus 10. HTTPS is designed to withstand such attacks and is considered secure against such attacks. HTTP operates at the highest layer of the TCP/IP model, the Application layer; as does the SSL security protocol (operating as a lower sublayer of the same layer), which encrypts an HTTP message prior to transmission and decrypts a message upon arrival. Strictly speaking, HTTPS is not a separate protocol, but refers to use of ordinary HTTP over an encrypted SSL/TLS connection.

If the external input device 40da includes a network connection unit other than the communication unit 611, such as a LAN port, there is a possibility that the network connection unit other than the communication unit 611 is connected to the Internet. In this case, information from the communication apparatus 10da or the external input device 40da might be leaked due to an attack from the Internet. In this embodiment, the information from the communication apparatus 10da or the external input device 40da is protected from the attack by using the HTTPS protocol for transmitting and receiving data between the communication apparatus 10da and the external input device 40da. Hence, increased security (safety) may be provided. Moreover, as a preferred example, the external input device 40da may be configured to cancel using a communication unit other than the communication unit 611 when communicating with the communication apparatus 10da via the communication unit 611.

When the connection request from the external input device 40da is received by the cable communication unit 602 (step S704), the server unit 608 of the communication apparatus 10da transmits a login screen in an encrypted HTML (hypertext markup language) format to the external input device 40da via the cable communication unit 602 (step S705). Then, the browser unit 617 of the external input device 40da causes the screen display unit 615 to display the login screen on the display 208, and receives a one-time password input by the user (step S706).

Figure 9:
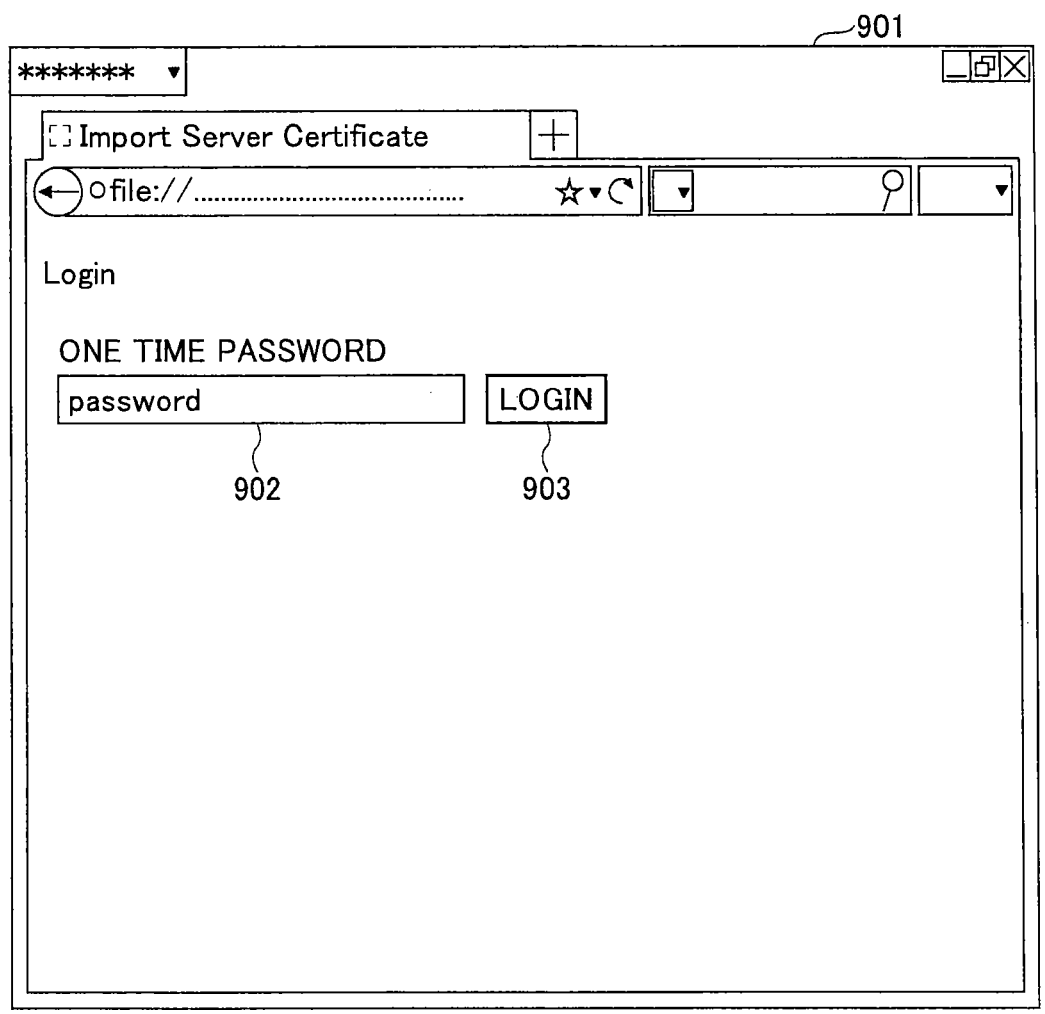
FIG. 9 is a diagram showing an example of a login screen displayed in the communication system according to the first embodiment.

FIG. 9 shows an example of a login screen 901 which is displayed by the browser unit 617 of the external input device 40da. As shown in FIG. 9, an input column 902 of a one-time password and a login button 903 are displayed in the login screen 901. It is assumed that the one-time password displayed by the display unit 603 of the communication apparatus 10da is input to the input column 902 in the login screen 901 by the user. If the login button 903 is pressed by the user after the one-time password is input to the input column 902, the browser unit 617 transmits a login request including the input one-time password to the communication apparatus 10da via the communication unit 611 (step S707).

Upon receipt of the login request from the external input device 40da, the acquisition unit 604 of the communication apparatus 10da causes the login authentication unit 609 to compare the one-time password included in the login request with the one-time password generated by the password generation unit 610. When the one-time password included in the login request is in agreement with the one-time password generated by the password generation unit 610, the login authentication unit 609 permits the login of the external input device 40da (step S708). Otherwise the login authentication unit 609 rejects the login of the external input device 40da.

By performing the login authentication process, it is possible to prevent the acquisition unit 604 from processing a request from a third party other than the external input device 40da. Because it is assured that the user of the external input device 40da has requested to communicate with the communication apparatus 10da, the communication apparatus 10da may safely import the certification information (the login information). Moreover, the login information generated in this embodiment is a one-time password which is valid for only one login session or transaction, and increased safety may be provided.

Figure 10:
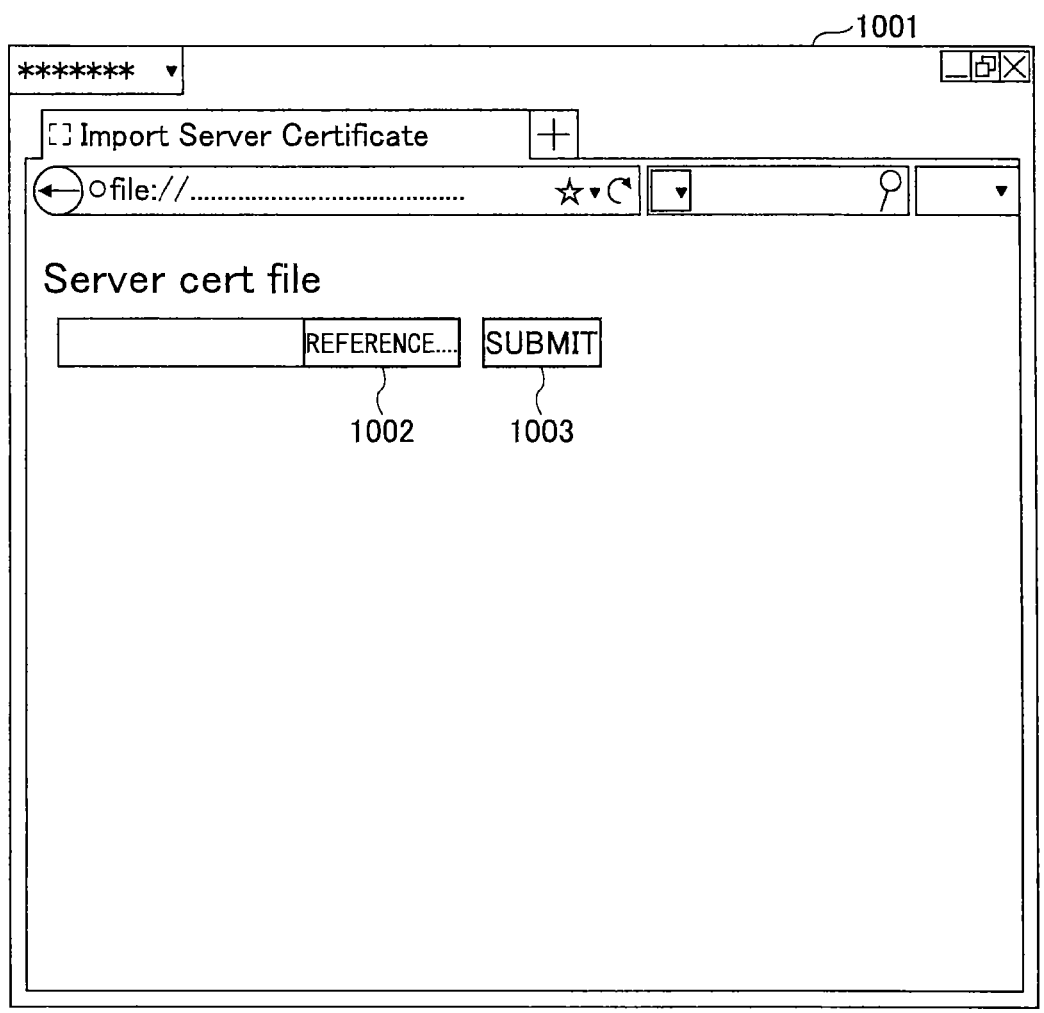
FIG. 10 is a diagram showing an example of a certificate selection screen displayed in the communication system according to the first embodiment.

After the login of the external input device 40da is permitted by the login authentication unit 609, the server unit 608 transmits through the cable communication unit 602 to the external input device 40da a certificate selection screen in a HTML format to be displayed by the browser unit 617 of the external input device (step S709). FIG. 10 shows an example of a certificate selection screen 1001 which is displayed by the browser unit 617 of the external input device 40da. If the user presses a REFERENCE button 1002 in the certificate selection screen 1001 shown in FIG. 10, a list of certificate files available is displayed. If the user selects one of the certificate files in the list and presses a SUBMIT button 1003, the certificate management unit 616 reads from the certificate storage unit 612 the certificate information (the selected certificate file) (step S710), and transmits the read certificate information to the communication apparatus 10da (step S711).

Figure 11:
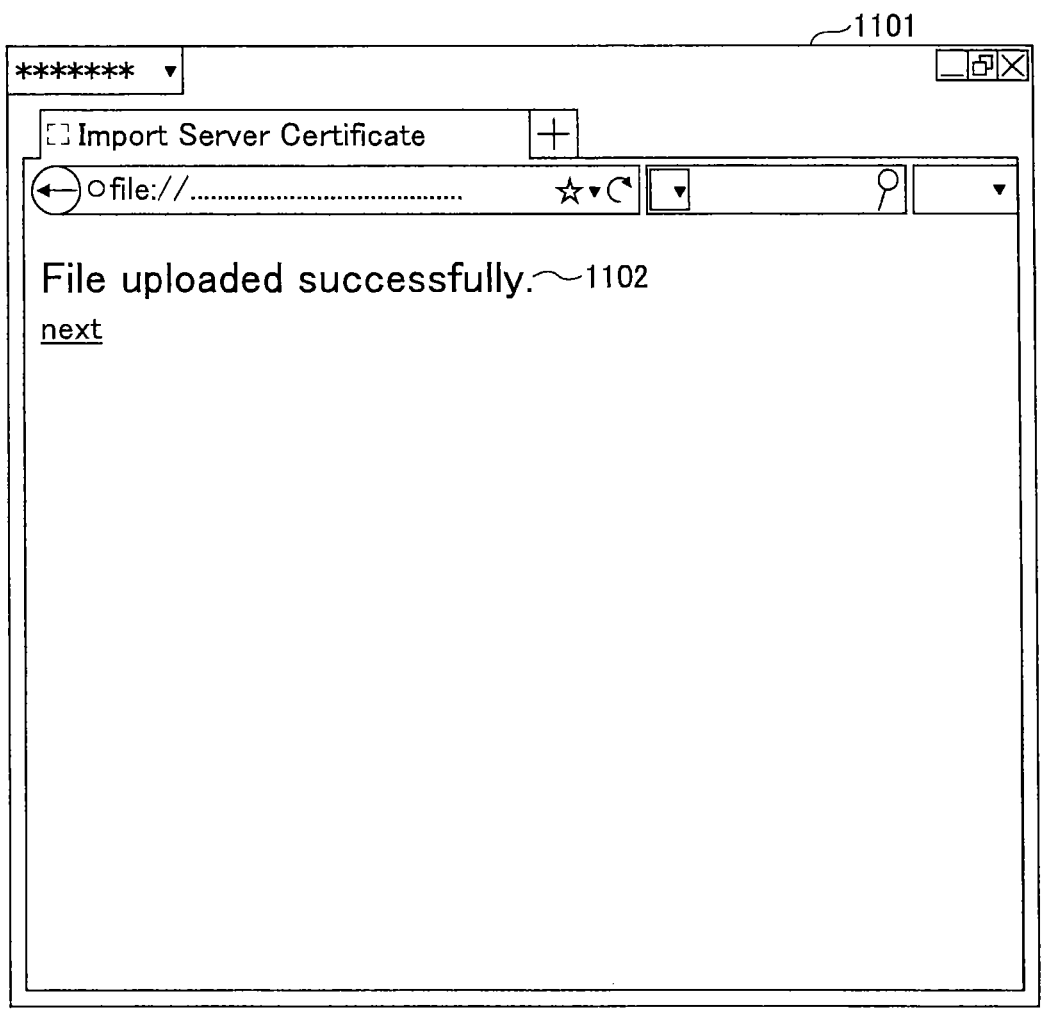
FIG. 11 is a diagram showing an example of a result screen displayed in the communication system according to the first embodiment.

Subsequently, the acquisition unit 604 of the communication apparatus 10da stores the certificate information, received from the external input device 40da by the server unit 608, in the storage unit 606 (step S712). The server unit 608 transmits a transmission result screen in a HTML format for displaying a transmission result by the browser unit 617 to the external input device 40da via the cable communication unit 602 (step S713). FIG. 11 shows an example of a transmission result screen 1101 which is displayed by the browser unit 617 of the external input device 40da. As shown in FIG. 11, a transmission result ("File uploaded successfully") 1102 is displayed in the transmission result screen 1101. On the other hand, when the transmission of the certificate information has failed, such transmission result 1102 is displayed in the transmission result screen 1101.

Subsequently, the connection request unit 605 of the communication apparatus 10da reads the certificate information from the storage unit 606 (step S714). The connection request unit 605 transmits a connection request including the read certificate information to the communication management device 80 via the wireless communication unit 601 and the access point 60a as a connection permission request (step S715).

The connection unit 619 of the access point 60a transmits the connection request, received from the communication apparatus 10da via the wireless transmission/reception unit 620, to the communication management device 80 via the cable transmission/reception unit 618 as a connection propriety request (step S716). At this time, the access point 60a transfer the connection request, and the authentication process is performed between the communication apparatus 10da and the communication management device 80.

After the connection request including the certificate information is received from the access point 60a via the transmission/reception unit 622, the authentication unit 621 of the communication management device 80 makes reference to the authentication management database 623 and performs an authentication process (step S717). Subsequently, the authentication unit 621 informs the access point 60a of the result of the authentication process via the transmission/reception unit 622 (step S718).

After the result of the authentication process is received from the communication management device 80, the connection unit 619 of the access point 60a checks the result of the authentication process. If the authentication process has finished successfully, the connection unit 619 permits connection of the communication apparatus 10da with the network (step S719). Thereby, the communication apparatus 10da is connected to the network (step S720) so that the communication apparatus 10da may communicate with other communication apparatuses installed in remote places. Namely, the preparation of the communication apparatus 10da for performing teleconferencing by wireless communication is completed.

On the other hand, when the authentication process has finished in failure, the connection unit 619 does not permit connection of the communication apparatus 10da with the network.

In the communication apparatus 10da, the certificate information acquired from the external input device 40da is stored in the storage unit 606, such as the flash memory 104 shown in FIG. 3. However, after the communication apparatus 10da is connected to the network, the stored certificate information may be deleted from the storage unit 606. By deleting the certificate information from the storage unit 606, it is possible to prevent the certificate information from being read out illegally.

Moreover, when the communication apparatus 10da is connected to the network, the communication apparatus 10da may be configured to register the certificate information in a secure domain, such as a registry, and thereafter delete the certificate information from the storage unit 606. In this case, even if the communication apparatus 10da deletes the certificate information from the storage unit 606, the communication apparatus 10da may be connected to the network again based on the information registered in the registry.

Further, as a preferred example, the communication apparatus 10da may be configured to cancel or delete the certificate information acquired from the external input device 40*da* according to predetermined conditions, when a predetermined operation is performed by the user, when the communication session is finished, or when the power of the communication apparatus 10*da* is turned off. In this case, it is necessary to import the certificate information from the external input device 40*da* when connecting the communication apparatus 10*da* to the network again. It is possible to effectively prevent the leakage of information due to illegal use of the communication apparatus 10*da* by a third party.

As described above, it is possible for the communication apparatus 10*da* according to the present embodiment to safely and easily import the certificate information required for network connection from the external input device 40*da*. Specifically, the certificate information required for network connection may be imported safely and easily using the cable communication unit 602 of the communication apparatus 10*da*, such as a cable LAN port. Furthermore, the tapping or spoofing by a third party may be reduced by using the interconnection between the communication apparatus 10*da* and the external input device 40*da* by a cross LAN cable without using a server.

Moreover, the communication apparatus 10*da* includes the login authentication unit 609 to perform login authentication of the external input device 40*da*, and it is possible to import the certification information (the login information) more safely. Further, the communication apparatus 10*da* includes the password generation unit 610 and performs login authentication by using the one-time password generated by the password generation unit 610, and it is possible to provide increased security.

Second Embodiment

In the first embodiment, the communication apparatus 10*da* and the external input device 40*da* are interconnected by a cross LAN cable. However, the interconnection between the communication apparatus 10*da* and the external input device 40*da* may be established by wireless communication instead of the cable communication.

Figure 12:
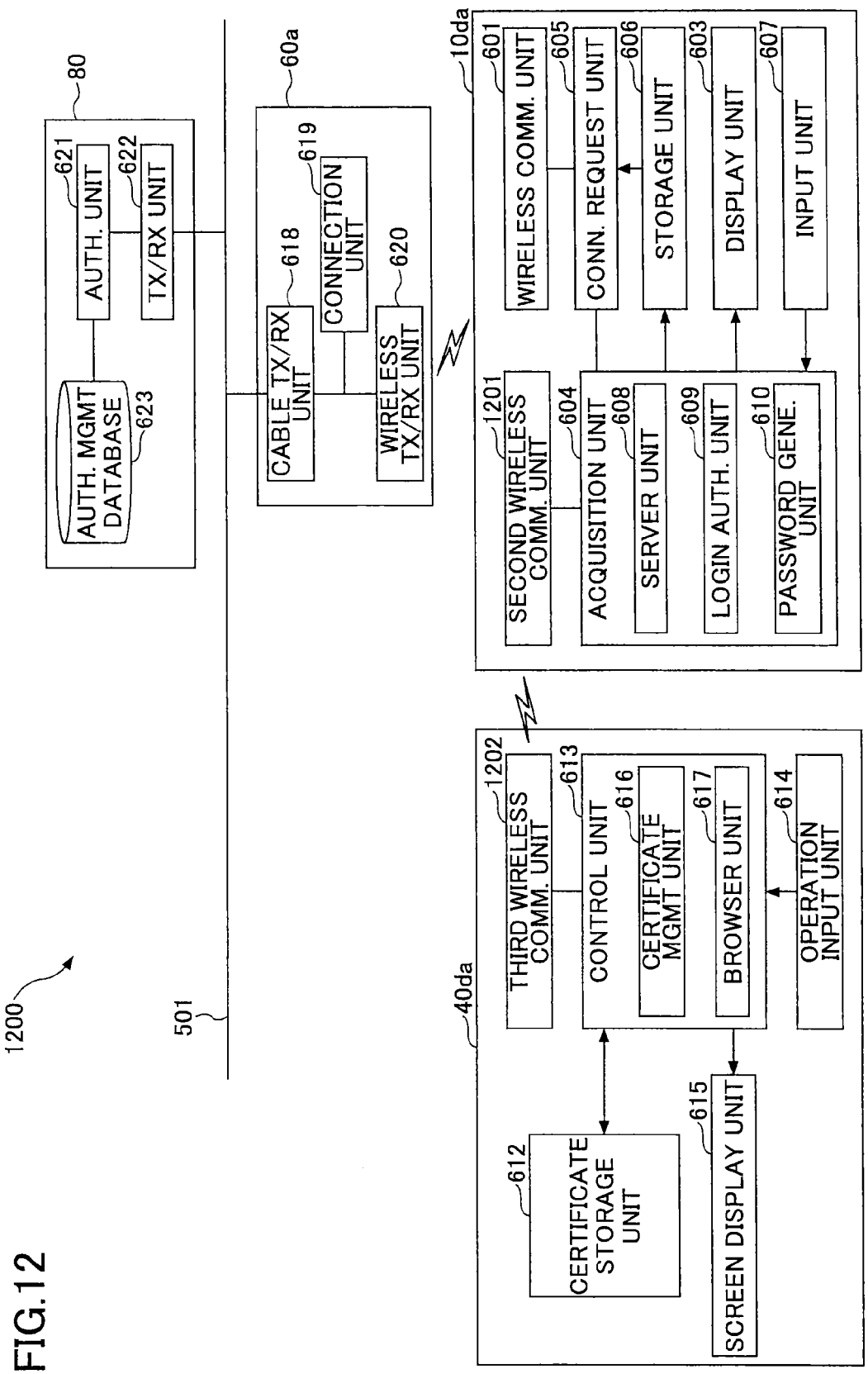
FIG. 12 is a diagram showing a functional configuration of a communication system according to a second embodiment.

FIG. 12 is a functional configuration of a communication system 1200 according to a second embodiment. As shown in FIG. 12, the communication apparatus 10*da* is configured to include a second wireless communication unit 1201 instead of the cable communication unit 602 shown in FIG. 6. Moreover, as shown in FIG. 12, the external input device 40*da* is configured to include a third wireless communication unit 1202 instead of the communication unit 611 or in addition to the communication unit 611 shown in FIG. 6. Because the rest of the configuration of the communication system 1200 according to this embodiment is essentially the same as that of the first embodiment, a description thereof will be omitted. Only the points of the second embodiment which are different from the first embodiment will be described.

The second wireless communication unit 1201 and the third wireless communication unit 1202 are configured to transmit and receive data using the wireless LAN conforming to the standard of IEEE802.11. Moreover, the second wireless communication unit 1201 and the third wireless communication unit 1202 are configured to connect with each other in the ad hoc mode.

Figure 13:
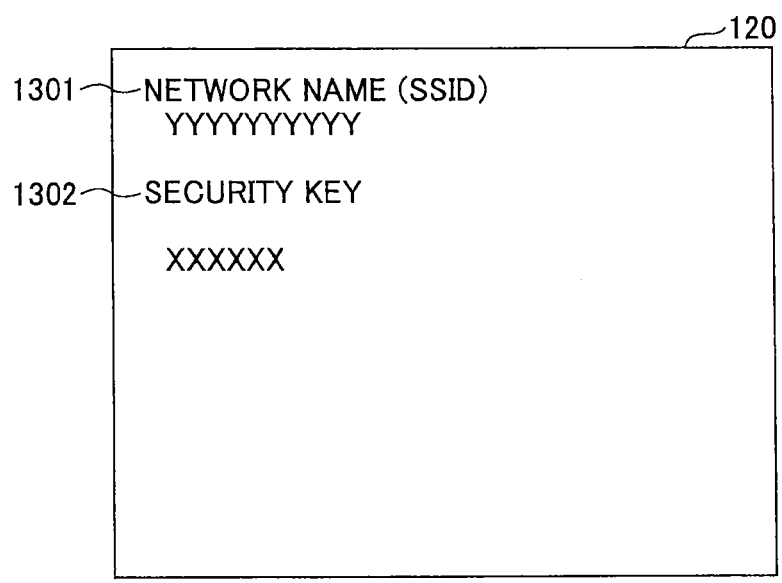
FIG. 13 is a diagram showing an example of setup information of the ad hoc mode displayed in the communication system according to the second embodiment.

To interconnect the communication apparatus 10*da* and the external input device 40*da* in the ad hoc mode, setting of network connection information is required. In this embodiment, the display unit 603 of the communication apparatus 10*da* is configured to display the setup information of the ad hoc mode on the display 120. FIG. 13 shows an example of the setup information of the ad hoc mode displayed in the communication apparatus 10*da*. As shown in FIG. 13, the communication apparatus 10*da* displays a network name 1301 of the communication apparatus 10*da*, a security key 1302 of the communication apparatus 10*da*, and other setup information required for the communication in the ad hoc mode on the display 120 shown in FIG. 3. Thereafter, the user inputs the network name 1301 and the security key 1302 displayed on the communication apparatus 10*da* into a network setting screen of the external input device 40*da* so that the radio interconnection in the ad hoc mode may be established.

As a preferred example, the communication apparatus 10*da* may be configured to change a value of the security key 1302 each time the setup information of the ad hoc mode shown in FIG. 13 is displayed. In this case, it is possible to provide increased security.

After the interconnection between the communication apparatus 10*da* and the external input device 40*da* in the ad hoc mode is established by the above-described operation, the wireless communication setup process to connect the communication apparatus 10*da* with the network by the wireless communication unit 601 may be performed in accordance with the process shown in FIG. 7 similar to the first embodiment.

As described above, according to the present embodiment, communication between the communication apparatus 10*da* and the external input device 40*da* may be established without using a cross LAN cable. Hence, a smart phone, a tablet terminal, etc., which have no cable LAN port, may be utilized as the external input device 40*da* in the communication system 1200.

The wireless LAN is an example of the communication method of the second wireless communication unit 1201 and the third wireless communication unit 1202. The present invention is not limited to this embodiment. For example, the communication method of the second wireless communication unit 1201 and the third wireless communication unit 1202 may be based on other radio communication methods, such as Bluetooth and UWB (ultra-wide band).

When the interconnection between the communication apparatus 10*da* and the external input device 40*da* is established by the wireless LAN, the communication apparatus 10*da* does not necessarily require two wireless LAN interfaces. For example, the wireless LAN interface 121 shown in FIG. 3 may be shared by the wireless communication unit 601 (first wireless communication unit) and the second wireless communication unit 1201. Alternatively, the communication apparatus 10*da* may be configured to include no wireless communication unit 601 and use the second wireless communication unit 1201 having acquired the certificate information through the interconnection between the communication apparatus 10*da* and the external input device 40*da*, to connect with the communication network 501. Furthermore, the wireless communication unit 601 of the communication apparatus 10*da* in the communication system 1200 shown in FIG. 12 may be replaced by a cable communication unit.

Third Embodiment

Figure 14:
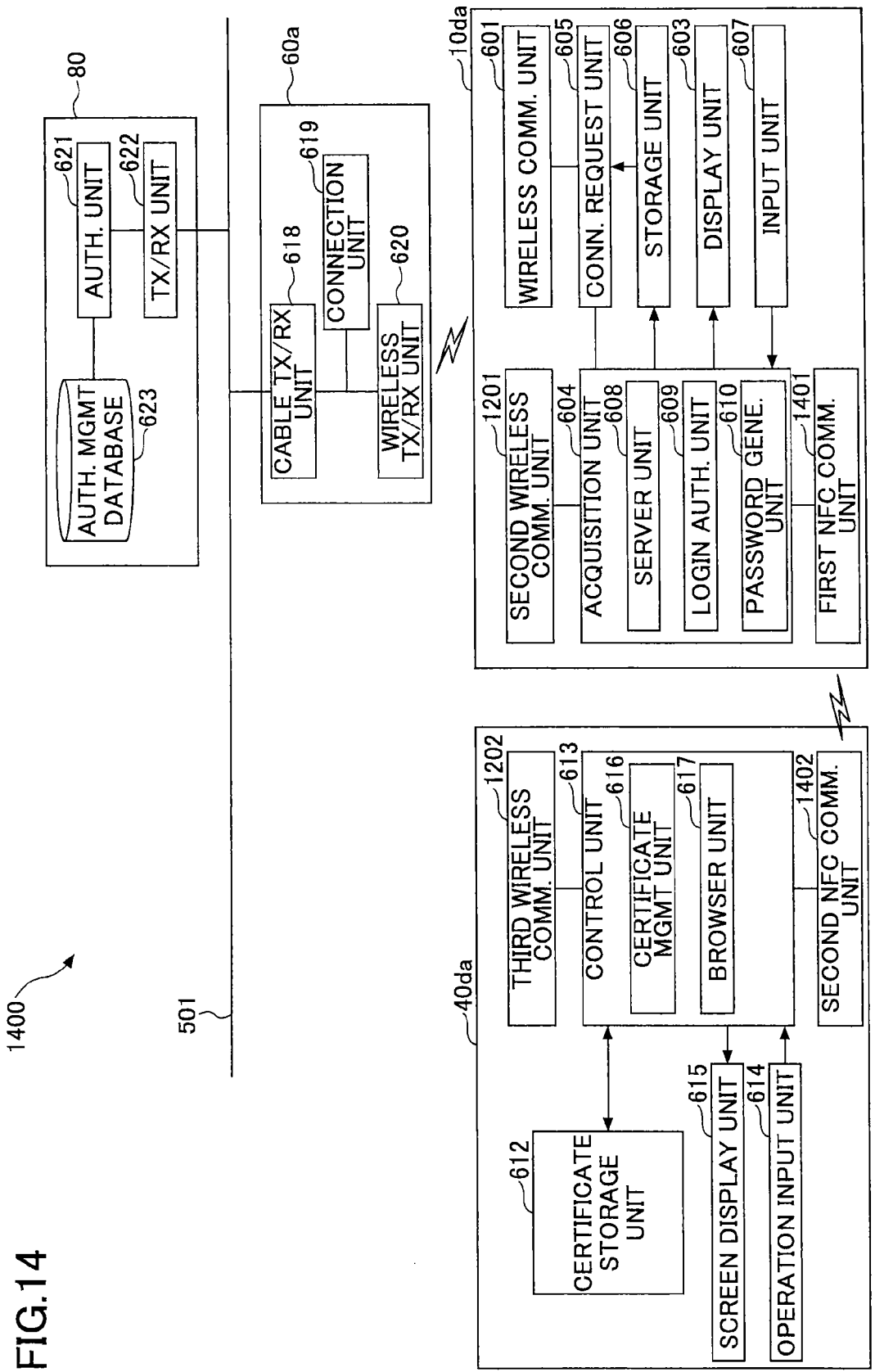
FIG. 14 is a diagram showing a functional configuration of a communication system according to a third embodiment.

FIG. 14 shows a functional configuration of a communication system 1400 according to a third embodiment. In this embodiment, the communication apparatus 10*da* and the external input device 40*da* are configured to include a first NFC communication unit 1401 and a second NFC communication unit 1402, respectively, which are communication units conforming to the NFC (near field communication) standard.

The first NFC communication unit 1401 and the second NFC communication unit 1402 are designed to perform non-contact short-distance radio communication (NFC communication) in conformity with the requirements of the NFC standard. When the second NFC communication unit 1402 of the external input device 40*da* approaches a communication range within a predetermined circle (e.g., less than 10 cm) around the communication apparatus 10*da*, the first NFC communication unit 1401 of the communication apparatus 10*da* receives predetermined data from the second NFC communication unit 1402 by NFC communication. At this time, the communication apparatus 10*da* has to check that the communication partner by NFC communication is the correct communication partner. In this embodiment, the communication apparatus 10*da* utilizes a one-time password as in the first and second embodiments, in order to authenticate the communication partner by NFC communication.

Figure 15:
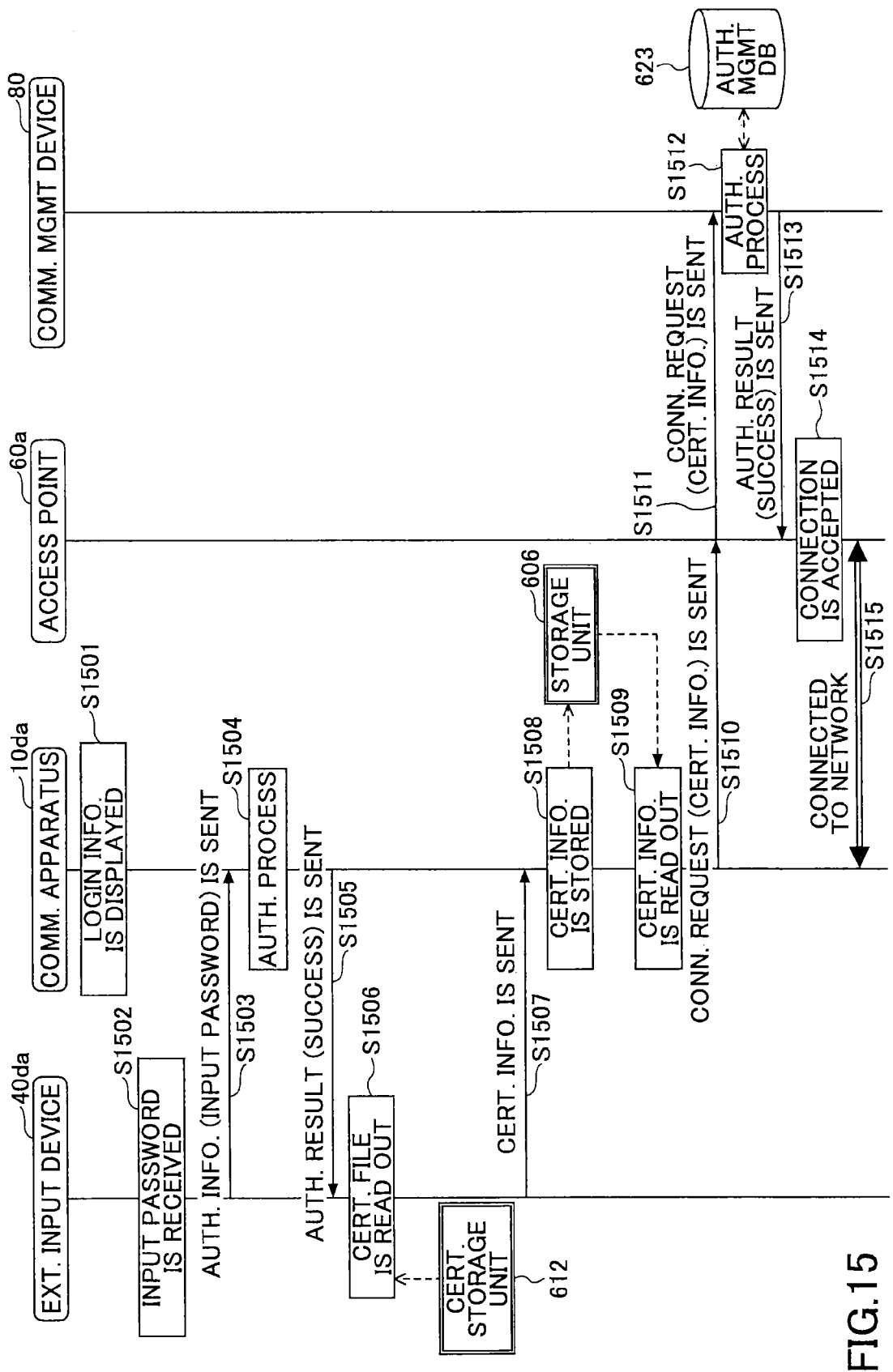
FIG. 15 is a sequence diagram for explaining a process performed by the communication system according to the third embodiment.

FIG. 15 is a sequence diagram for explaining a process performed by the communication system 1400 according to the third embodiment.

Figure 16:
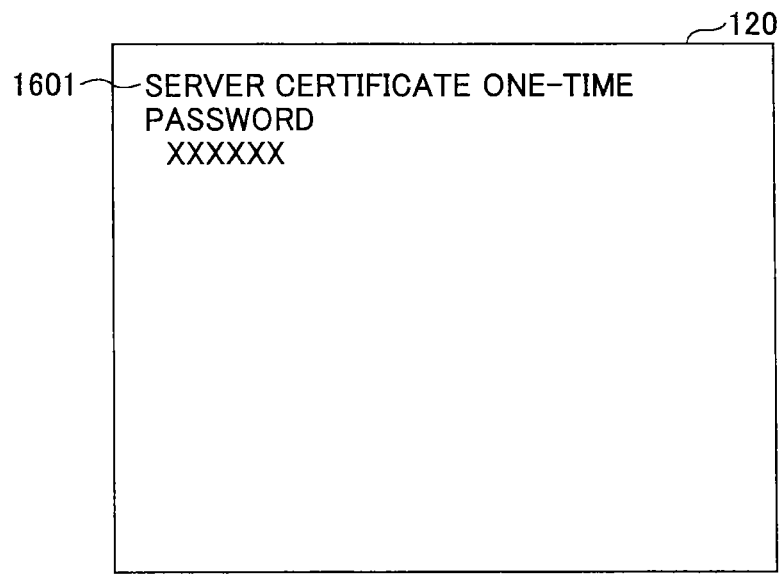
FIG. 16 is a diagram showing an example of a screen displayed in the communication system according to the third embodiment.

For example, when an instruction for starting a wireless communication setup process input by the user is received by the input unit 607, the communication apparatus 10*da* causes the display unit 603 to display a one-time password generated by the password generation unit 610 on the display 120 (step S1501). FIG. 16 shows an example of a login screen displayed at this time. As shown in FIG. 16, the communication apparatus 10*da* displays a one-time password 1601 on the display 120 shown in FIG. 3.

Figure 17:
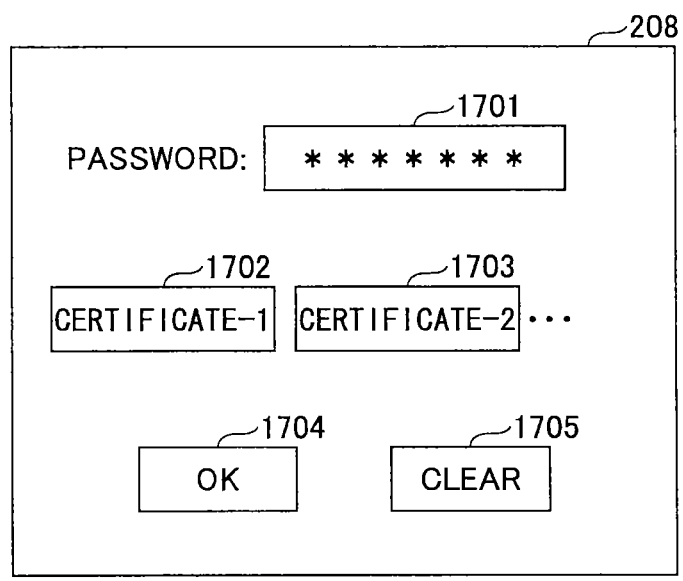
FIG. 17 is a diagram showing an example of a one-time password input screen displayed in the communication system according to the third embodiment.

Subsequently, the external input device 40*da* receives a one-time password input by the user (step S1502). Specifically, the control unit 613 of the external input device 40*da* causes the screen display unit 615 to display a one-time password input screen as shown in FIG. 17 on the display 208. FIG. 17 shows an example of the one-time password input screen displayed at this time. In the example of FIG. 17, a password input column 1701, two or more certificate input keys 1702 and 1703, an OK input key 1704, and a CLEAR input key 1705 are displayed on the display 208 of the external input device 40*da*. For example, the user inputs the one-time password displayed by the communication apparatus 10*da* into the password input column 1701 using the mouse 212 or the keyboard 211 shown in FIG. 4. When there are two or more certificate information items, the certificate input keys 1702 and 1703 may be displayed and the user is requested to select one of the certificate information items. Moreover, the clear input key 1705 to clear the user's input and the OK input key 1704 to confirm the user's input may be displayed. Further, if needed, the user may be requested to input other information such as a user ID.

If the user causes the second NFC communication unit 1402 of the external input device 40*da* to approach the first NFC communication unit 1401 of the communication apparatus 10*da* after the one-time password displayed by the communication apparatus 10*da* is input into the password input column 1701, NFC communication is established. When NFC communication is established, the second NFC communication unit 1402 of the external input device 40*da* transmits the certification information including at least the one-time password input by the user to the first NFC communication unit of the communication apparatus 10*da* (step S1503).

When the certification information is received by the communication apparatus 10*da*, the login authentication unit 609 compares the one-time password included in the certification information with the one-time password generated by the password generation unit 610 (step S1504). When the one-time password included in the certification information is in agreement with the one-time password generated by the password generation unit 610, an authentication result indicating that the authentication process has finished successfully is transmitted from the communication apparatus 10*da* to the external input device 40*da* (step S1505).

When the one-time password included in the certification information is not in agreement with the one-time password generated by the password generation unit 610, an authentication result indicating that the authentication process has finished in failure is transmitted from the communication apparatus 10*da* to the external input device 40*da*. Upon receipt of such authentication result, the external input device 40*da* causes the screen display unit 615 to display an error message on the display 208, and the process is terminated.

When the authentication result indicating that the authentication process has finished successfully is received from the communication apparatus 10*da*, the external input device 40*da* causes the certificate management unit 616 to read the certificate information (certificate file), which is specified with the certificate input keys 1702 and 1703, from the certificate storage unit 612 (step S1506). Moreover, the certificate management unit 616 transmits the read certificate information to the communication apparatus 10*da* through the second NFC communication unit (step S1507).

Subsequently, the acquisition unit 604 of the communication apparatus 10*da* stores the certificate information received from the external input device 40*da* in the storage unit 606 (step S1508). Next, the connection request unit 605 of the communication apparatus 10*da* reads the certificate information from the storage unit 606 (step S1509). Furthermore, the connection request unit 605 transmits a connection request including the read certificate information to the communication management device 80 via the wireless communication unit 601 as a connection permission request (step S1510). The access point 60*a* performs transferring of the connection request received from the communication apparatus 10*da* and transmits the connection request to the communication management device 80 as a relayed connection permission request (step S1511).

After the connection request including the certificate information is received from the access point 60*a* via the transmission/reception unit 622, the authentication unit 621 of the communication management device 80 makes reference to the authentication management database 623 and performs an authentication process (step S1512). Subsequently, the authentication unit 621 informs the access point 60*a* of the result of authentication process via the transmission/reception unit 622 (step S1513).

After the result of the authentication process is received from the communication management device 80, the connection unit 619 of the access point 60*a* checks the result of the authentication process. If the authentication process has finished successfully, the connection unit 619 permits connection of the communication apparatus 10*da* with the network (step S1514). Thereby, the communication apparatus is connected to the network (step S1515), so that the communication apparatus 10*da* may communicate with other communication apparatuses 10 installed in remote places.

As described above, it is possible for the communication apparatus 10*da* according to the present embodiment to safely and easily import the certificate information required for network connection from the external input device 40*da* by using the NFC communication units of the communication apparatus 10*da* and the external input device 40*da*. Furthermore, the communication apparatus 10*da* according to the present embodiment includes the login authentication unit 609 and the password generation unit 610 and performs authentication using the one-time password generated by the password generation unit 610, and therefore it is possible to reduce tapping or spoofing by a third party.

[Modification]

In the third embodiment, the certificate information is communicated by NFC communication. Moreover, the setup information required for the communication in the ad hoc mode between the second wireless communication unit 1201 and the third wireless communication unit 1202 shown in FIG. 14 may be set up by NFC communication.

For example, instead of reading the certificate information required for network connection in step S1506 in the process of FIG. 15, connection setting information (an SSID, a security key, etc.) for the third wireless communication unit 1202 shown in FIG. 14 may be read, and the read connection setting information may be transmitted to the communication apparatus 10*da*. Thereby, the communication apparatus 10*da* may easily set up the connection setting information of the ad hoc mode between the second wireless communication unit 1201 and the third wireless communication unit 1202 based on the connection setting information received from the external input device 40*da* by NFC communication.

Accordingly, the connection setting information of the ad hoc mode by the wireless LAN between the communication apparatus 10*da* and the external input device 40*da* may be easily set up.

The ad hoc mode by the wireless LAN is an example of the interconnection by wireless communication. The setting of the connection setting information using NFC communication is also applicable to other radio communication methods, such as Bluetooth and UWB.

Fourth Embodiment

In the foregoing embodiments, the connection of the communication apparatus 10*da* with the network such as the LAN 501 or the communication network 2 is implemented by the wireless LAN connection by the wireless communication unit 601. Meanwhile, IEEE 802.1X defines the encapsulation of the Extensible Authentication Protocol (EAP) over IEEE 802, which is known as EAPOL (EAP over LAN). IEEE 802.1X specifies the authentication of cable LAN and the authentication of wireless LAN. The communication apparatus according to the present invention may be adapted for the cable LAN connection.

Figure 18:
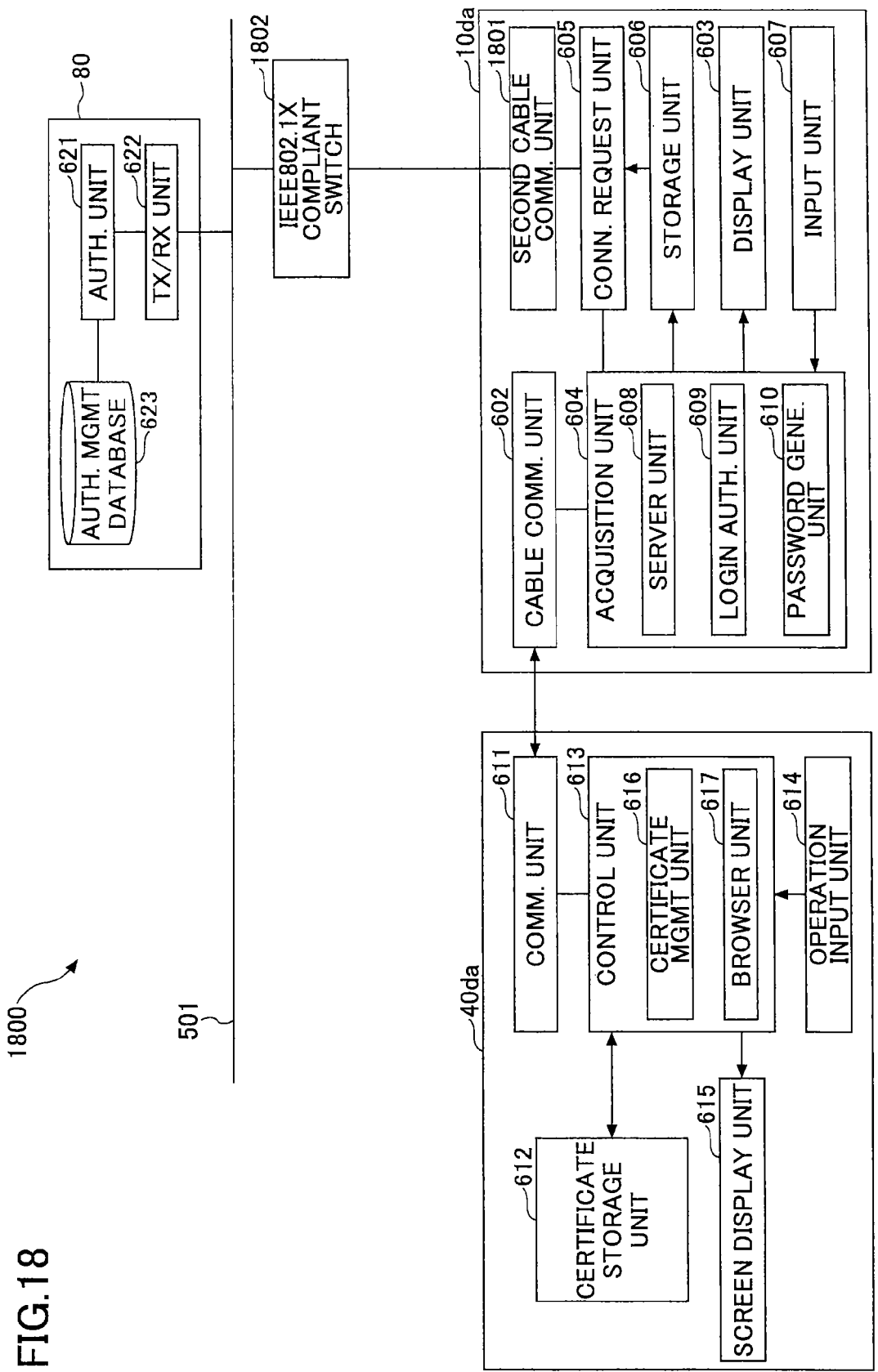
FIG. 18 is a diagram showing a functional configuration of a communication system according to a fourth embodiment.

FIG. 18 shows a functional configuration of a communication system 1800 according to a fourth embodiment. As shown in FIG. 18, the communication apparatus 10*da* includes a second cable communication unit 1801 instead of the wireless communication unit 601 of the first embodiment. Moreover, the communication system 1800 includes an IEEE802.1X compliant switch 1802 instead of the access point 60*a* of the first embodiment.

The second cable communication unit 1801 is configured to transmit and receive data using the network such as the LAN 501 and the cable LAN. The second cable communication unit 1801 may be implemented by the network interface 111 shown in FIG. 3 and the software for controlling the network interface 111.

The IEEE802.1X compliant switch 1802 has a configuration that is the same as that of the access point 60*a* as in the wireless LAN and is configured to perform switching to allow connection of an apparatus authenticated by the communication management device 80 with the network or reject connection of a non-authenticated apparatus with the network.

Operation of the communication system 1800 according to this embodiment is essentially the same as the operation of the communication system 500 according to the first embodiment except that the access point 60*a* shown in FIG. 7 is replaced by the IEEE802.1X compliant switch 1802.

As described above, it is possible for the communication apparatus 10*da* according to this embodiment to safely and easily import the certificate information required for network connection from the external input device 40*da*.

The communication apparatus according to the present invention is not limited to the above-described embodiment. The communication apparatus 10*da* does not necessarily require two cable LAN interfaces. For example, the network interface 111 shown in FIG. 3 may be shared by the cable communication unit 602 (first cable communication unit) and the second cable communication unit 1801. Alternatively, the communication apparatus 10*da* may be configured to include no second cable communication unit 1801 and use the cable communication unit 602 having acquired the certificate information through the interconnection between the communication apparatus 10*da* and the external input device 40*da* to connect with the network.

Moreover, the second cable communication unit 1801 shown in FIG. 18 may be configured so that the second cable communication unit 1801 (second communication unit) is deactivated when importing the certificate information from the external input device 40*da* by the cable communication unit 602 (first communication unit). Further, the wireless communication setup process shown in FIG. 7 may be modified such that the communication unit 601 different from the communication unit 602 used to establish the interconnection between the communication apparatus 10*da* and the external input device 40*da* is deactivated prior to the step S701 of displaying the login information. Moreover, if needed, the process of FIG. 7 may be modified such that the deactivated communication unit is activated again after step S720 in which the communication apparatus 10*da* is connected to the network.

In this manner, the communication unit 1801 different from the communication unit 602 used to import the certificate information from the external input device 40*da* is deactivated, and it is possible to prevent the certificate information from being leaked via the second cable communication unit 1801. Hence, the communication apparatus 10*da* may provide increased safety for communication with the network.

Moreover, an operation to deactivate the communication unit may be performed by the user. For example, the communication apparatus 10*da* may be configured to include a detection unit which detects whether the second cable communication unit 1801 is active when establishing the interconnection between the communication apparatus 10*da* and the external input device 40*da*. If the second cable communication unit 1801 is detected as being active when establishing the interconnection between the communication apparatus 10*da* and the external input device 40*da*, a message indicating that the second cable communication unit 1801 is active may be displayed, so that the user is requested to perform the operation to deactivate the second cable communication unit 1801.

Fifth Embodiment

The communication apparatus according to the present invention is applicable to various devices and systems having a communication function. For example, the communication apparatus 10 may be used as a car navigation device having a communication function. In the following, a case in which the communication apparatus 10 is used as a car navigation device is explained.

Figure 19:
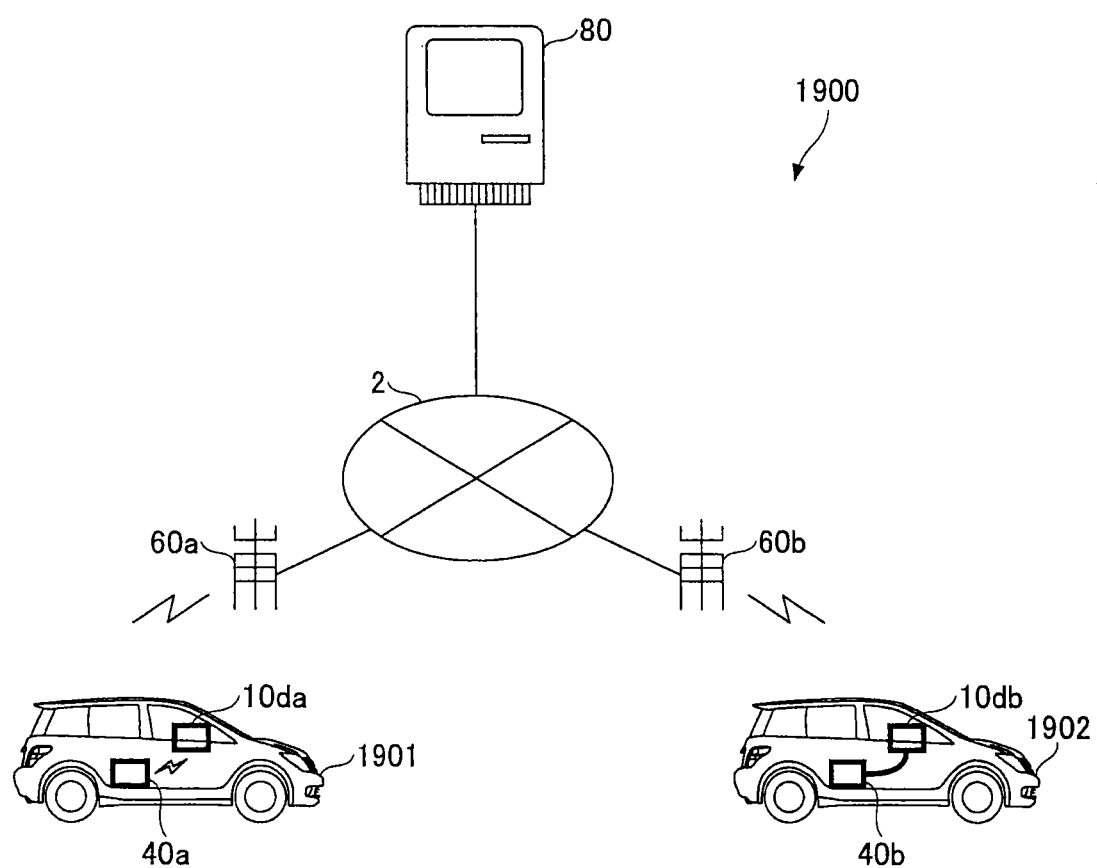
FIG. 19 is a diagram showing a configuration of a communication system according to a fifth embodiment.

FIG. 19 shows a configuration of a communication system 1900 according to a fifth embodiment. A fundamental configuration of the communication system 1900 according to this embodiment is essentially the same as that of the first embodiment and a description thereof will be omitted. Only the points of the fifth embodiment which are different from the first embodiment will be described.

As shown in FIG. 19, the communication system 1900 includes communication apparatuses 10da and 10db which are car navigation devices mounted on cars 1901 and 1902, respectively, external input devices 40a and 40b, access points 60a and 60b, and a communication management device 80.

It is assumed in this embodiment that the access points 60a and 60b are base stations or access points in a radio communication system for mobile phones, conforming to the standard of wireless LAN or WiMAX®. The communication management device 80 is a server or the like connected to the communication network 2, and configured to perform authentication to determine whether connection with the communication network 2 is permitted in response to a connection request from the communication apparatuses 10da and 10db. The communication apparatuses 10da and 10db are car navigation devices configured to communicate with the access point 60a or the access point 60b by wireless communication. When connection of the communication apparatuses 10da and 10db with the communication network 2 is permitted by the communication management device 80, data communication between the communication apparatuses 10da and 10db via the access points 60a and 60b and the communication network 2 is possible.

The number of the access points shown in FIG. 19 is an example. The communication system 1900 may include a larger number of access points.

Figure 20:
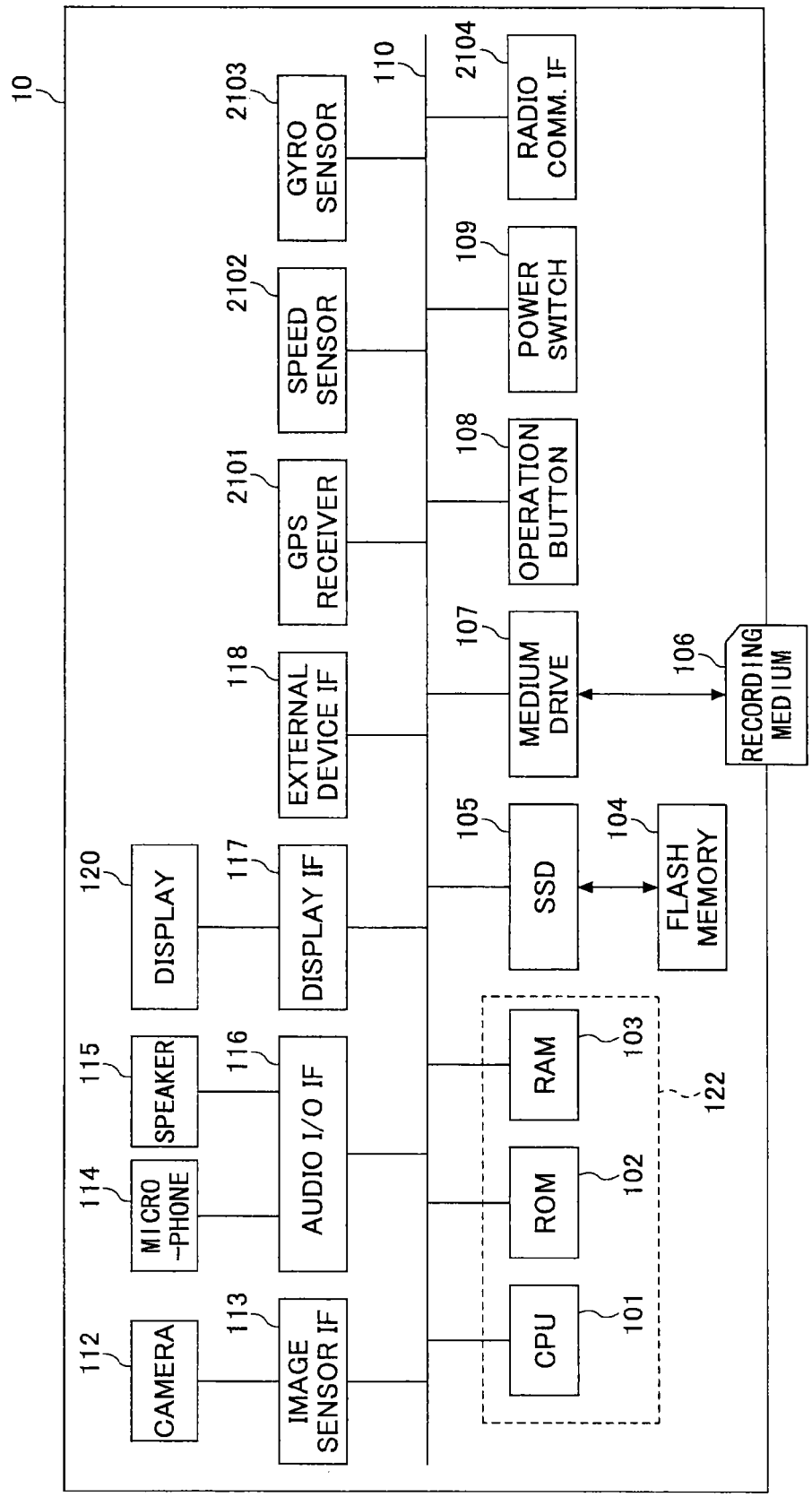
FIG. 20 is a diagram showing a hardware configuration of a communication apparatus in the communication system according to the fifth embodiment.

FIG. 20 shows a hardware configuration of a communication apparatus 10 according to the fifth embodiment. The hardware configuration of the communication apparatus 10 according to this embodiment is essentially the same as that of the first embodiment shown in FIG. 3 and a description thereof will be omitted. Only the points of the communication apparatus 10 of this embodiment which are different from the communication apparatus of the first embodiment will be explained.

As shown in FIG. 20, the communication apparatus 10 includes a GPS (global positioning system) receiver 2101, a speed sensor 2102, and a gyro sensor 2103 in addition to the components shown in FIG. 3. Moreover, the communication apparatus 10 includes a radio communication interface 2104 configured to perform radio communication conforming to the communication method which the access points 60a and 60b are constructed to comply with, instead of the wireless LAN interface 121 shown in FIG. 3. Furthermore, as shown in FIG. 20, the communication apparatus 10 includes a built-in display 120.

Although the illustration of the network interface 111 and the alarm lamp 119 as shown in FIG. 3 is omitted in the hardware configuration of FIG. 20, the communication apparatus 10 according to this embodiment may further include the network interface 111 and the alarm lamp 119.

The control unit 122 is configured to execute the programs stored in the ROM 102, the flash memory 104 or the recording medium 106, so that the communication apparatus 10 operates as a car navigation device. Moreover, the control unit 122 is configured to execute the programs stored in the ROM 102, the flash memory 104 or the recording medium 106 to implement the respective functional units of the communication apparatus 10da shown in FIG. 6.

The GPS receiver 2101 is configured to receive satellite GPS signals and output coordinates of a current position of the car based on the GPS signals. The speed sensor 2102 is configured to detect a rotational speed of a wheel of the car. The gyro sensor 2103 is configured to detect an angular velocity of the car and detect a traveling direction of the car by integration of the angular velocity.

Road map data is stored in the flash memory 104 or the recording medium 106. The road map data is configured to express geographical roads by the combination of nodes and links, and may be downloaded from an external device. A road map is displayed on the display 120 based on the road map data stored in the flash memory 104 or the recording medium 106.

Moreover, the communication apparatus 10 may be configured to include an audio unit which outputs music or a TV broadcast program. Further, the communication apparatus 10 may be configured to include a browser unit which displays a web site image.

With the above-described configuration, the communication apparatus 10 generates an estimated car location through the cumulative navigation based on the mileage detected by the speed sensor 2102 in the traveling direction detected by the gyro sensor 2103 applied to the position information detected by the GPS receiver 2101. The estimated car location is displayed on the road map with a car location indicator or the like.

Moreover, by establishing the one-to-one cable or radio connection between the communication apparatus 10 and the external input device 40 via the external device interface 118, the communication apparatus 10 acquires from the external input device 40 the certification information, such as the certificate information required for connection with the communication network 2. By performing the process shown in FIG. 7, the communication apparatus 10 acquires the certificate information from the external input device 40 and sends a connection request including the acquired certificate information to the communication management device 80. If the authentication process has finished successfully by the communication management device 80, the communication apparatus 10 is permitted to connect with the communication network 2 via the radio communication interface 2104. Although the communication apparatus 10 is mounted on the car (mobile object), the communication apparatus 10 connected with the communication network 2 is able to transmit and receive various data via the communication network 2 similar to the communication apparatus 10 installed in an office environment in a fixed way.

The hardware configuration of the communication apparatus 10 according to the present embodiment is not limited to the above-described configuration shown in FIG. 20. For example, the camera 112, the microphone 114, and the speaker 115 may be external components or devices provided outside the communication apparatus 10. Further, the communication apparatus 10 does not necessarily require the camera 112, the microphone 114, and the speaker 115.

Moreover, the communication apparatus 10 may be configured to include another control unit to carry out the car navigation function in addition to the control unit 122 to control the communication function of the communication apparatus 10. Furthermore, the components of the communication apparatus 10 may be divided into two or more groups, such as a car navigation function group and a communication function group, and such groups of the components may be separately arranged in the car. Alternatively, each of the cars 1901 and 1902 may be configured to operate as the communication apparatus 10. In addition, the communication apparatus 10 may be configured to be a mobile car navigation device including no speed sensor 2102.

As described in the foregoing, according to the present invention, it is possible to provide a communication apparatus which supplies enhanced prevention of leakage of information from the communication apparatus and allows a user to set up security information in a simple manner.

The communication apparatus according to the present invention is not limited to the specifically disclosed embodiments, and variations and modifications may be made without departing from the scope of the present invention.

The present application is based upon and claims the benefit of priority of Japanese Patent Application No. 2013-134146, filed on Jun. 26, 2013, and Japanese Patent Application No. 2014-006624, filed on Jan. 17, 2014, the contents of which are incorporated herein by reference in their entirety.

What is claimed is:

1. A communication apparatus, comprising:
a first interface circuit configured to connect with an external device by cable in a one-to-one relationship by an interconnection between the communication apparatus and the external device, the external device storing certificate information required for connection with a network;
a second interface circuit configured to connect with the network by cable to transmit the certificate information to a communication management device; and
processing circuitry configured to:
determine whether the certificate information is to be imported from the external device;
acquire the certificate information from the external device connected with the first interface circuit;
send a request for connection with the network to the communication management device, the request including the acquired certificate information, so that the communication management device determines whether to permit the connection with the network in response to the request received from the communication apparatus; and
deactivate the second interface circuit when the processing circuitry determines that the certificate information is to be imported from the external device by the first interface circuit, and maintain the deactivation prior to and during a time when the certificate information is being imported,
wherein the processing circuitry is further configured to activate the second interface circuit when the communication management device determines to permit the connection and the communication apparatus is connected to the network.

2. The communication apparatus according to claim 1, wherein the second interface circuit is configured to connect with the network by radio when the connection with the network is not deactivated.

3. The communication apparatus according to claim 1, wherein the second interface circuit is configured to connect with the network by cable when the connection with the network is not deactivated.

4. The communication apparatus according to claim 1, wherein the first interface circuit is configured to transmit and receive data to and from the external device by a secure communication protocol.

5. The communication apparatus according to claim 1, further comprising:
a display configured to display login information required for a login of the external device for the connection with the external device,
wherein the processing circuitry is further configured to determine whether to permit the login using the login information displayed by the display, and
send the request including the certificate information to the communication management device when the login is permitted.

6. The communication apparatus according to claim 5, wherein the login information includes a one-time password which is valid for only one login session or transaction each time the login information is displayed by the display.

7. The communication apparatus according to claim 5, further comprising:
a server configured to supply a web page to which the login information is input by a user.

8. A communication system, including
the communication apparatus according to claim 1, and
the external device, wherein the external device comprises:
an external-device communication circuit configured to connect with the communication apparatus in the one-to-one relationship;
a memory configured to store the certificate information required for connection with the network; and
a transmitter configured to transmit the certificate information from the memory to the communication apparatus through the external-device communication circuit when the external device is connected with the communication apparatus.

9. The communication apparatus according to claim 1, wherein the communication apparatus performs a login authentication when the first interface circuit connects with the external device by the interconnection between the communication apparatus and the external device.

10. A non-transitory computer-readable recording medium storing a program representing a sequence of instructions, the program which when executed by a processor of a communication apparatus, causes the processor to perform a communication method comprising:
providing a first interface circuit that connects with an external device by cable in a one-to-one relationship by an interconnection between the communication apparatus and the external device, the external device storing certificate information required for connection with a network;
determining whether the certificate information is to be imported from the external device;
providing a second interface circuit configured to connect with the network by cable to transmit the certificate information to a communication management device, wherein the second interface circuit is deactivated when it is determined in the determining step that the certificate information is to be imported from the external device by the first interface circuit, and the deactivation is maintained prior to and during a time when the certificate information is being imported;

acquiring the certificate information from the external device connected with the first interface circuit;

sending a request for connection with the network to the communication management device, the request including the certificate information acquired in the acquiring, so that the communication management device determines whether to permit the connection with the network in response to the request received from the communication apparatus; and activating the second interface circuit when the communication management device determines to permit the connection and the communication apparatus is connected to the network.

11. The non-transitory computer-readable recording medium according to claim 10, wherein the communication method further comprises:

displaying login information required for a login of the external device for the connection with the external device; and determining whether to permit the login using the login information displayed in the displaying, wherein the acquiring includes acquiring the certificate information from the external device when the login is permitted in the determining.

* * * * *